(12) United States Patent
Ito et al.

(10) Patent No.: US 7,164,515 B2
(45) Date of Patent: Jan. 16, 2007

(54) OPTICAL SCANNING DEVICE

(75) Inventors: Masao Ito, Ashigarakami-gun (JP); Kosuke Yamada, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 390 days.

(21) Appl. No.: 10/388,748

(22) Filed: Mar. 17, 2003

(65) Prior Publication Data

US 2004/0031915 A1    Feb. 19, 2004

(30) Foreign Application Priority Data

Aug. 15, 2002    (JP)    ............... 2002-236797

(51) Int. Cl.
G02B 26/08    (2006.01)
(52) U.S. Cl. ..................... 359/204; 347/233
(58) Field of Classification Search .................. None
See application file for complete search history.

(56) References Cited

U.S. PATENT DOCUMENTS 5,639,950 A    6/1997    Verma et al.

5,748,223 A * 5/1998 Ito ............................ 347/241

FOREIGN PATENT DOCUMENTS

JP    A 08-292384    11/1996
JP    A 2001-215423    8/2001

* cited by examiner

Primary Examiner—James Phan
(74) Attorney, Agent, or Firm—Oliff & Berridge, PLC

(57) ABSTRACT

High quality images are provided without the occurrence of image quality defects due to reciprocity law failures, even when scanning a multi-beam. When interlaced scanning is employed, it is possible to select combinations such that, taking any freely selected neighboring scanning lines, respective scan numbers of the neighboring scanning lines are always different. Thus, a duration of scanning spacing can be made to be at least the duration of a single main scan. As a result, image defects such as banding due to reciprocity law failures can be greatly alleviated, and images can be provided in which image defects are to unlikely to be noticed in practice.

10 Claims, 23 Drawing Sheets

FIG.6

SCAN NUMBER: j=1    LINE NUMBER: L=(n·j+1)+i(k-1)
BEAM NUMBER: k=1
◁ LINE NUMBER: L=33 j=2 j=3 k=32
j=1 →
k=1 →
j=4 j=4

INTERLACED SCANNING
    PERIOD: i

| i \ n | 1 | 2 | 3 | 4 | 5 | 6 | 7 | 8 | 9 |
|---|---|---|---|---|---|---|---|---|---|
| 9 | × | ○ | × | ○ | ○ | × | ○ | ○ | × |
| 8 | × | × | ○ | × | ○ | × | ○ | × | ○ |
| 7 | × | ○ | ○ | ○ | ○ | ○ | × | ○ | ○ |
| 6 | × | × | × | × | ○ | × | ○ | × | × |
| 5 | × | ○ | ○ | ○ | × | ○ | ○ | ○ | ○ |
| 4 | × | × | ○ | × | ○ | × | ○ | × | ○ |
| 3 | × | ○ | × | ○ | ○ | × | ○ | ○ | × |
| 2 | × | × | ○ | × | ○ | × | ○ | × | ○ |
| 1 | — | — | — | — | — | — | — | — | — |

NUMBER OF BEAMS: n

○ COMBINATIONS OF n AND i FOR WHICH INTERLACED SCANNING IS ESTABLISHED

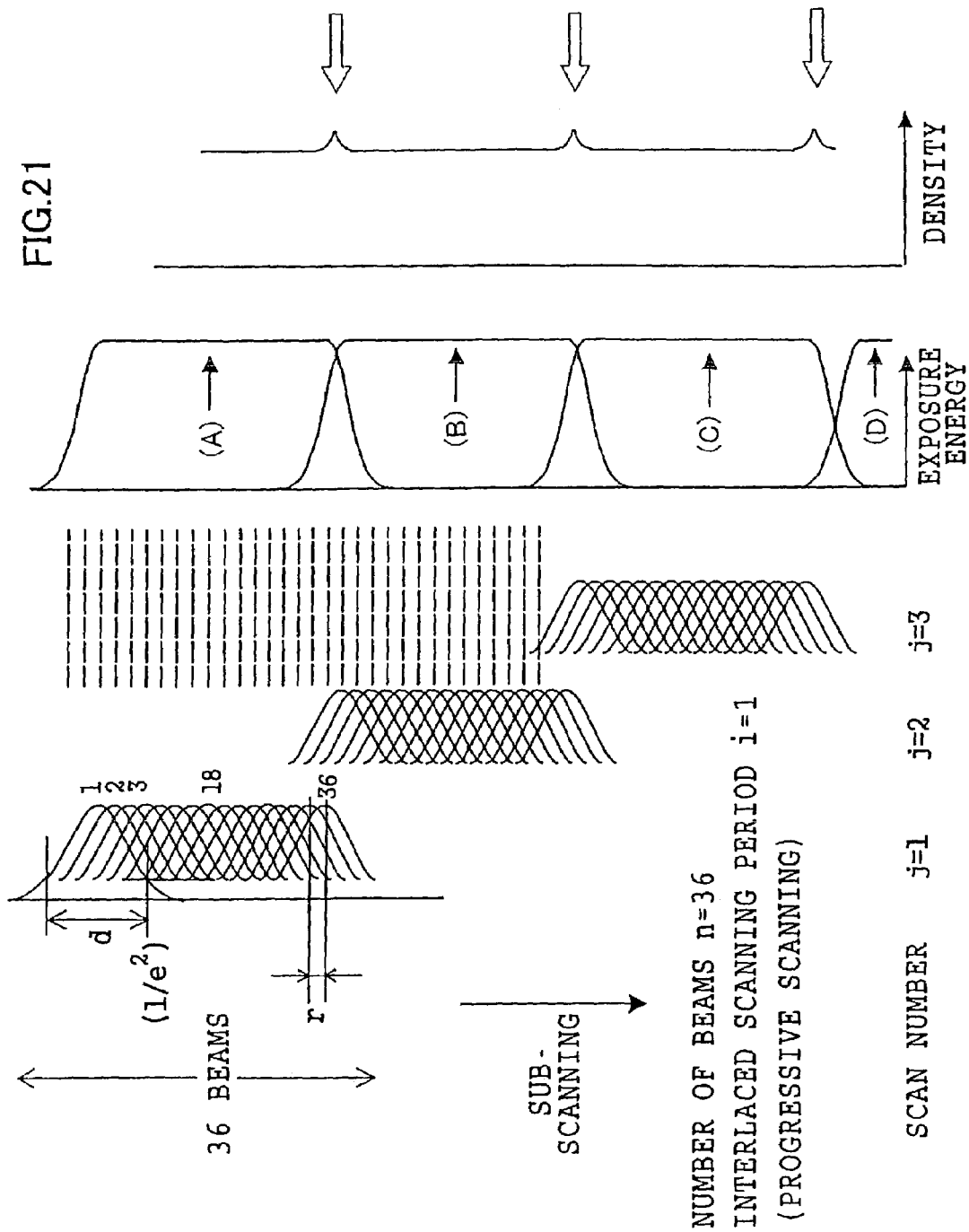

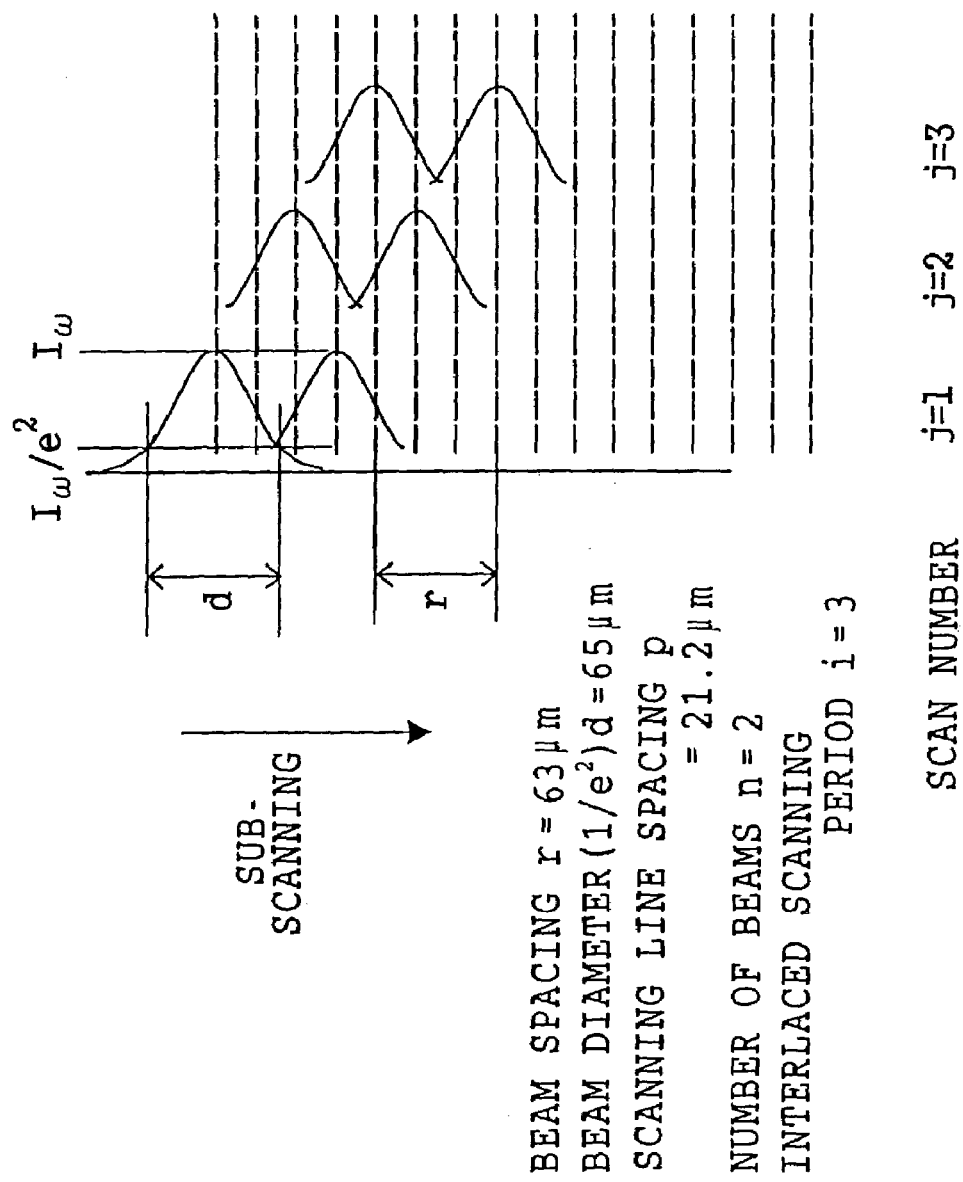

PHOTORECEPTOR

OPTICAL SCANNING DEVICE

BACKGROUND OF THE INVENTION

1. Field of the Invention

The present invention relates to an optical scanning device, and particularly relates to an excellent optical scanning device which is employed in a digital copier, a laser beam printer or the like and which carries out simultaneous writing with a plurality of laser beams.

2. Description of the Related Art

In FIG. 2 of Japanese Patent Application Laid-Open (JP-A) No. 2001-215423, an optical scanning device which scans with a multi-beam irradiated from a multi-spot laser diode is disclosed. Further, in FIG. 3 of the same publication, a multi-spot laser diode is disclosed.

The multi-spot laser diode is a vertical cavity surface emitting laser (VCSEL) in which a plurality of light emitting spots are arranged in two dimensions. In the multi-spot laser diode, a total of thirty-six light emitting spots are disposed two-dimensionally with predetermined spacings, six in a main scanning direction by six in a sub-scanning direction.

FIG. 20 of the present application is a block diagram showing an example of a driving circuit of a multi-spot laser diode. Each laser diode in a array is independently driven with video signals by independent video interface circuits A and B and LD drivers A and B.

The optical scanning device described in the aforementioned JP-A No. 2001-215423 is provided with a photodiode. This photodiode receives a portion of a light beam emitted from the laser array and transmits light amount signals to an unillustrated light amount control circuit, and thus light amounts of the beam are controlled so as to attain a target value.

A laser beam irradiated from the laser array is scanned on a surface (that is, a scanning surface) of a photoreceptor, which is provided to be rotatable about a central axis thereof, by a multi-beam scanning optical system. The multi-beam scanning optical system is formed by a collimator lens, an aperture which limits the diameter of a beam from the collimator lens, a cylinder lens having optical power only in the sub-scanning direction, a mirror, a polygon mirror, an f-θ lens, a first cylinder mirror and a second cylinder mirror. Herein, scanning of the beam in accordance with rotation of the polygon mirror is referred to as main scanning, and scanning due to movement of the scanning surface in a direction intersecting the main scanning direction is referred to as sub-scanning.

In this structure, an unillustrated mirror and an unillustrated photosensor are provided at a position corresponding to an end portion of the photoreceptor, for detecting a position of the scanning beam in the main scanning direction. A timing for output of image signals to the laser array is set by a beam position detection signal outputted from the photosensor.

FIG. 21 is a diagram showing an exposure profile which is formed in the sub-scanning direction by the laser beams on the scanning surface in a case of scanning writing using this optical scanning device. Here, a number of laser beams n=36, and a case of progressive scanning is shown. That is, neighboring beams are scanned along respectively neighboring scanning lines of a raster image.

The optical scanning device carries out simultaneous scanning of 1st to 36th scanning lines using a 1st laser beam to a 36th laser beam at a time of a 1st cycle of scanning of the beams (represented by a scan number (j=1) in the drawing). Then the optical scanning device carries out simultaneous scanning of 37th to 72nd scanning lines with the laser beams for scan number (j=2). Thereafter, scanning of blocks of 36 lines in order of scan numbers (j=3), (j=4), . . . is similarly recursively carried out in the same manner.

FIG. 22 is a diagram describing a conventional technique for writing with interlaced scanning. This technique is described in, for example, Japanese Patent No. 3,237,452. Herein, a natural number i ($\geq 2$), which is a spacing r between two neighboring beams divided by a scanning line spacing p, is defined as an "interlaced scanning period". Note that i=1 for progressive scanning.

For example, if the scanning period i=(r/p)=3, that is, if the spacing r between two beams is specified to be 3p (p being the scanning line spacing), then for the scan number (j=1), a 1st scanning line is formed by a 1st laser beam and a 4th scanning line is formed by a 2nd laser beam. Then, when the scan number (j=2), a 3rd scanning line is formed by the 1st laser beam and a 6th scanning line is formed by the 2nd laser beam. In the same way, for scan number (j=3) and onward, 5th, 7th, 9th, . . . scanning lines are formed by the first laser beam and 8th, 10th, 12th, . . . scanning lines are synchronously formed by the second laser beam.

At this time, if a number of beams n=2, the beam spacing r=62.5 μm and the scanning line spacing p=20.83 μm, then the following equation holds.

$$1/(n \cdot p) = 1/(2 \times 0.02083)$$
$$= 24.0 \geq 4 \text{ line pairs/mm}$$

It has been written that, because irregularities of light amounts that are caused by multi-beam scanning are not discernible by the human eye, excellent images can be obtained.

In the optical scanning device represented in FIG. 21, a beam diameter d (of $1/e^2$ intensity) is around 65 μm, and is large in comparison to the scan spacing p (approx. 10.6 μm). Thus, overlapping of neighboring beams is large when progressive scanning is carried out. Therefore, an exposure profile resulting from scan number (j=1) is as shown by (A) in FIG. 21, and an exposure profile resulting from (j=2) is as shown by (B). Here, respective vicinities in a vicinity from a 5th scanning line to a 30th scanning line are exposed by a plurality of beams acting together. A time difference between exposure timings of cooperating beams is up to two μs.

In contrast, an exposure portion between the 36th scanning line and the 37th scanning line is exposed by scan number (j=1), and is then exposed again by the first laser beam for scan number (j=2) after an interval of around 300 μs. Thereafter, scanning for scan numbers (j=3, 4, . . . ) recurs in the same manner, and the exposure profiles (C), (D), . . . are successively formed.

Now, an electric charge amount generated by a photoreceptor is proportional to an amount of absorbed light, that is, to a product of exposure intensity and exposure duration, and this is generally referred to as a reciprocity law. However, in a case of exposure with extremely short periods, amounts of variation in electric potential are small compared with a case of exposure over relatively long periods, even if the total light amounts are equivalent between the two cases. Thus, reciprocity failures occur.

FIGS. 23A and 23B are diagrams for explaining reciprocity law failures. FIG. 23A is a diagram showing states of electrons and a positive hole when light is incident at a photoreceptor. FIG. 23B is a diagram showing an electrical charge generation amount in relation to irradiation time difference. In a case in which a time difference between irradiations at the photoreceptor is short, charge density of a charge generation layer is reduced and, as shown in FIG. 23B, a recombination rate of electrons and holes is reduced. Thus, reciprocity law failures occur.

As a result of such reciprocity law failures, optical density between the 36th scanning line and the 37th scanning line as shown in FIG. 21 is more dense than at other regions, and a density fluctuation appears with a period of the number of beams n.

For example, in the case of an optical scanning device which is structured with the number of beams being 36 and the scanning line spacing p=21.16 μm, banding with a period of 0.762 mm is generated. Converted to a spatial frequency, this is 1.31 (cycle/mm). Hereafter, this banding is referred to as "banding due to reciprocity law failures".

FIG. 24 is a diagram showing a characteristic of contrast sensitivity at the human eye against spatial frequency (herebelow referred to as the visual transfer function (VTF) of the human eye). According to the VTF of the human eye, the human eye can easily distinguish density fluctuations when a spatial frequency of an image is around 1 cycle/mm, but it is more difficult to distinguish images with a high frequency, of 3 cycle/mm or above.

However, in the case of the aforementioned optical scanning device with the number of beams being 36 and the scanning line spacing p=21.16 μm, banding of 1.31 cycle/mm due to reciprocity law failures occurs. As can be seen from FIG. 24, this banding can easily be distinguished by human visual characteristics, and image quality is adverse affected.

SUMMARY OF THE INVENTION

The present invention is proposed for solving the problem described above, and an object of the present invention is to provide an optical scanning device which can provide a high quality image without image defects due to reciprocity law failures occurring when a multi-beam is scanned.

An optical scanning device of a first aspect of the present invention includes a laser array which emits laser beams including a number of beams n; and a laser scanning section which, when an interlaced scanning period i, which is at least 2, is set to a natural number i which is a quotient when a beam spacing r on a scanned surface, between beams which are adjacent in a sub-scanning direction, is divided by a scanning line spacing p at the scanned surface, scans the laser beams emitted from the laser array with the interlaced scanning period i such that: $1/(n \cdot p) \leq 3$ cycle/mm.

Hence, according to the first aspect of the present invention, it is possible to select combinations such that, taking any freely selected neighboring scanning lines, respective scan numbers of the neighboring scanning lines are always different. Therefore, a scanning spacing duration can be set to be at least the duration of one main scan. As a result, image quality defects such as banding due to reciprocity law failures can be greatly alleviated, and images can be provided in which image quality defects that occur are hard to discern in practical use.

Herein, the effects of reciprocity law failures can be further reduced by applying second to fourth aspects of the present invention to the first aspect of the present invention, and images which are free of image quality defects may be provided.

The second aspect of the present invention is the first aspect of the present invention, in which the laser scanning section scans the laser beams such that the beam number n and the interlaced scanning period i are relatively prime natural numbers, and n>i.

The third aspect of the present invention is the first aspect of the present invention, in which the laser scanning section scans the laser beams such that the beam number n and the interlaced scanning period i are relatively prime natural numbers and a remainder when $\{i \cdot (n-1)+1\}$ is divided by the beam number n is a natural number less than n.

The fourth aspect of the present invention is any one of the first to third aspects of the present invention in which the laser array emits the laser beams such that a beam diameter d, for intensities of the laser beams on the scanned surface of $1/e^2$ of peak intensity, and the beam spacing r satisfy: $d/1.70 \leq r \leq d$.

Herein, according to the fourth aspect of the present invention, by specifying the intensities of the laser beams to satisfy the conditions described above, energy amounts provided at reciprocity law failures are made smaller, and density fluctuations are made smaller. Thus, a high quality image can be provided.

A fifth aspect of the present invention includes a laser array which emits laser beams including a number of beams n; and a laser scanning section which, when an interlaced scanning period i, which is at least 2, is set to a natural number i which is a quotient when a beam spacing r on a scanned surface, between beams which are adjacent in a sub-scanning direction, is divided by a scanning line spacing p at the scanned surface, scans the laser beams emitted from the laser array with the interlaced scanning period i such that: $1/(n \cdot p \cdot i) \leq 0.4$ cycle/mm.

Thus, according to the fifth aspect of the present invention, image quality defects such as banding due to reciprocity law failures can be made harder to discern with the human eye, and a high quality image can be formed.

A sixth aspect of the present invention includes a laser array which emits laser beams including a number of beams n; and a laser scanning section which, when an interlaced scanning period i, which is at least 2, is set to a natural number i which is a quotient when a beam spacing r on a scanned surface, between beams which are adjacent in a sub-scanning direction, is divided by a scanning line spacing p at the scanned surface, a period of repetition in the sub-scanning direction of the image is m, which is a natural number, multiplied by the scanning line spacing p, and a smallest common product of i, m and n is E, scans the laser beams emitted from the laser array with the interlaced scanning period i such that: $1/(E \cdot p) \leq 0.4$ cycle/mm.

Thus, according to the sixth aspect of the present invention, image quality defects such as banding due to reciprocity law failures can be made harder to discern with the human eye, and a high quality image can be formed.

A seventh aspect of the present invention includes a laser array which emits laser beams including a number of beams n; and a laser scanning section which, when an interlaced scanning period i, which is at least 2, is set to a natural number i which is a quotient when a beam spacing r on a scanned surface, between beams which are adjacent in a sub-scanning direction, is divided by a scanning line spacing p at the scanned surface, the number of facets of a polygon mirror which deflects the laser beams in a main scanning direction is q, and a smallest common product of i, n and q is F, scans the laser beams emitted from the laser array with the interlaced scanning period i such that: $1/(F \cdot p) \leq 0.4$ cycle/mm.

Thus, according to the seventh aspect of the present invention, image quality defects such as banding due to reciprocity law failures can be made harder to discern with the human eye, and a high quality image can be formed.

An eighth aspect of the present invention includes a laser array which emits laser beams including a number of beams n; and a laser scanning section which, when an interlaced scanning period i, which is at least 2, is set to a natural number i which is a quotient when a beam spacing r on a scanned surface, between beams which are adjacent in a sub-scanning direction, is divided by a scanning line spacing p at the scanned surface, the number of facets of a polygon mirror which deflects the laser beams in a main scanning direction is q, a period of repetition in the sub-scanning direction of the image is m, which is a natural number, multiplied by the scanning line spacing p, and a smallest common product of i, m, n and q is G, scans the laser beams emitted from the laser array with the interlaced scanning period i such that: $1/(G \cdot p) \leq 0.4$ cycle/mm.

Thus, according to the eighth aspect of the present invention, image quality defects such as banding due to reciprocity law failures can be made harder to discern with the human eye, and a high quality image can be formed.

BRIEF DESCRIPTION OF THE DRAWINGS

FIG. 6 is a diagram showing exposure energies and densities due to each of beams when a number of beams n=32, a scanning line spacing p=10.6 µm and an interlaced scanning period i=3.

FIG. 7 is a diagram showing conditions for a number of lasers n and an interlaced scanning period i when interlaced scanning is to be established.

FIG. 21 is a diagram showing exposure profiles formed in a sub-scanning direction by laser beams on a scanning surface, in a case of scanning for writing using a conventional optical scanning device.

FIG. 22 is a diagram describing a conventional technique for writing by interlaced scanning.

DESCRIPTION OF THE PREFERRED EMBODIMENTS

Below, preferable embodiments of the present invention will be described in detail with reference to the drawings.

First Embodiment

Figure 1:
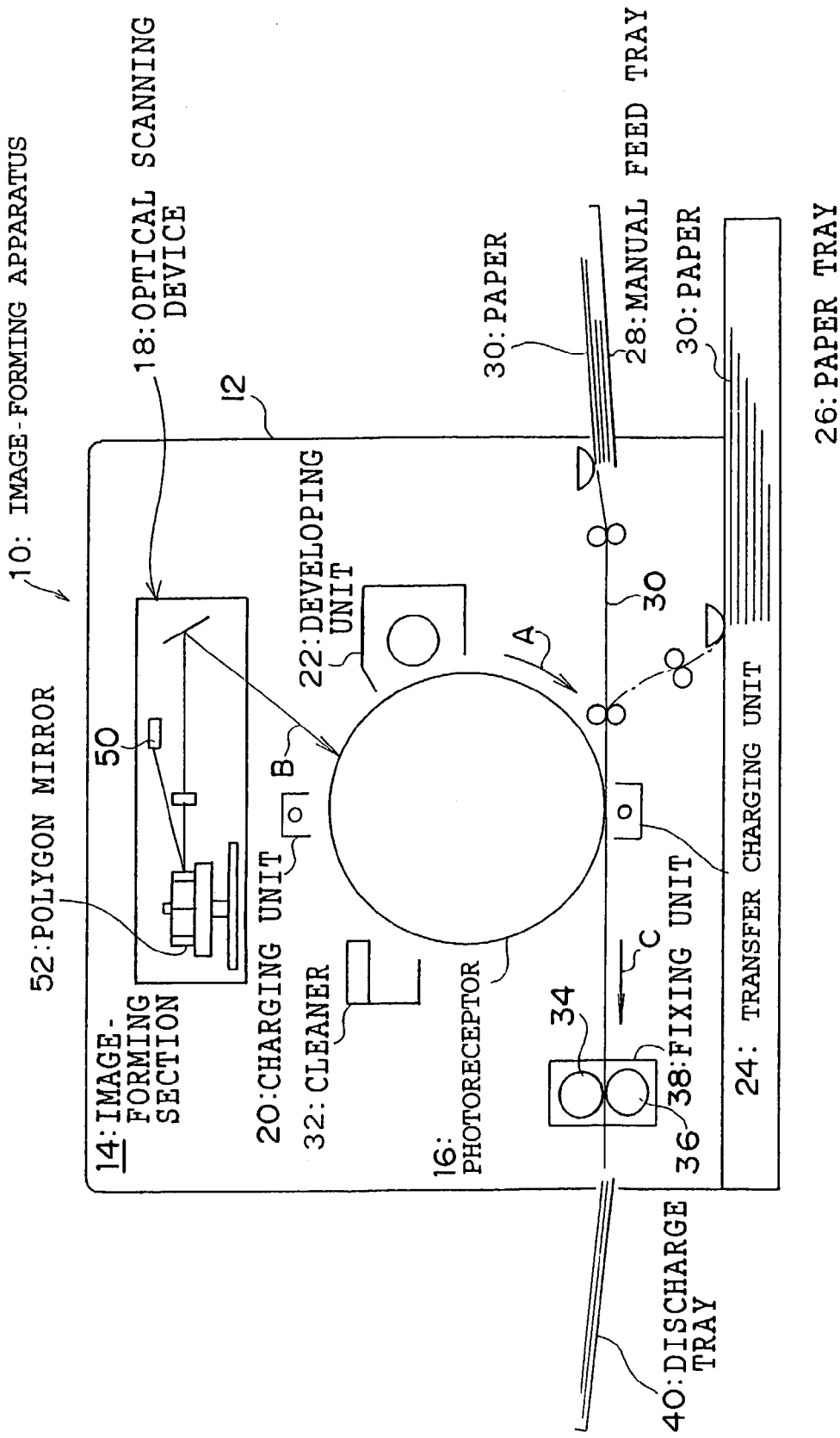
FIG. 1 is a diagram showing schematic structure of an image-forming apparatus relating to an embodiment of the present invention.

FIG. 1 is a diagram showing general structure of an image-forming apparatus 10 relating to the embodiment of the present invention. The image-forming apparatus 10 is covered by a casing 12.

An image-forming section 14 is provided inside the casing 12. The image-forming section 14 is provided with a cylindrical photoreceptor 16 and an optical scanning device 18. The photoreceptor 16 rotates at a constant speed in the direction of an arrow A shown in FIG. 1. The optical scanning device 18 irradiates light beams based on desired image data toward the photoreceptor 16 (in the direction of an arrow B in FIG. 1) while main scanning.

A charging unit 20 is disposed in a peripheral surface vicinity of the photoreceptor 16. The charging unit 20 charges the photoreceptor 16 uniformly. As a result of the photoreceptor 16 rotating in the direction of arrow A at a predetermined speed, the light beam irradiated from the optical scanning device 18 scans in a sub-scanning direction. Accordingly, a latent image is formed on the peripheral surface of the photoreceptor 16.

A developing unit 22 which supplies toner to the photoreceptor 16 is disposed facing the peripheral surface of the photoreceptor 16, at a downstream side in the direction of rotation of the photoreceptor 16 from a position of irradiation of the light beam from the optical scanning device 18. The toner supplied from the developing unit 22 adheres at portions which have been irradiated by the light beam from the optical scanning device 18. As a result, a toner image is formed on the peripheral surface of the photoreceptor 16.

A transfer charger 24 is disposed facing the peripheral surface of the photoreceptor 16, at a downstream side of the photoreceptor 16 in the direction of rotation of the photoreceptor 16 from the position at which the developing unit 22 is disposed (at a position vertically below an axial center of the photoreceptor 16). The transfer charger 24 transfers the toner image formed on the peripheral surface of the photoreceptor 16 to paper 30, which is guided between the photoreceptor 16 and the transfer charger 24 from a paper tray 26 or a manual feed tray 28.

A cleaner 32 is disposed facing the photoreceptor 16, at a downstream side in the rotation direction of the photoreceptor 16 from the position at which the transfer charger 24 is disposed. Toner remaining at the peripheral surface of the photoreceptor 16 after transfer is removed by the cleaner 32.

The paper 30 to which the toner image has been transferred is ejected in the direction of an arrow C. A fixing unit 38, which is structured to include a pressure roller 34 and a heating roller 36, is disposed at a downstream side from the photoreceptor 16 in the direction of ejection of the paper 30. At the fixing unit 38, the paper 30 to which the toner image has been transferred and which is being ejected is subjected to pressure and heated, and the toner is fixed by melting. That is, a "fixing process" is performed at the fixing unit 38, and the predetermined image is recorded on the paper 30. The fixing process is achieved, and the paper 30 on which the image has been recorded is ejected to a discharge tray 40.

Figure 2:
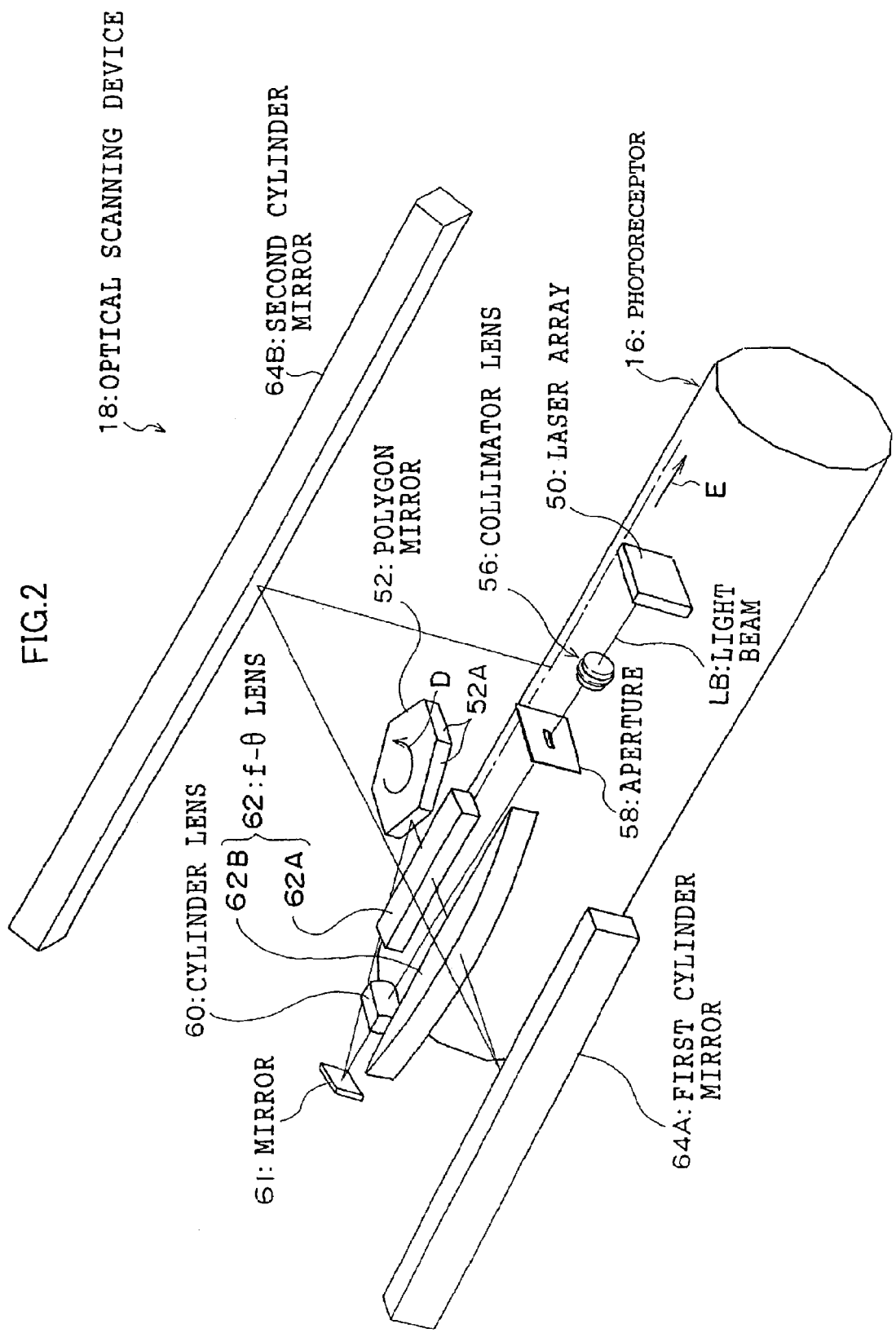
FIG. 2 is a diagram showing detailed structure of an optical scanning device.

FIG. 2 is a view showing detailed structure of the optical scanning device 18.

The optical scanning device 18 is provided with an array-form semiconductor laser (below referred to as a "laser array") 50 and a polygon mirror (a rotating multi-faced mirror) 52. The polygon mirror 52 is formed in a regular polygonal shape (a regular hexagonal shape in the present embodiment) provided with a plurality of reflection surfaces 52A at side faces thereof, and is rotated at high speed in the direction of an arrow D by an unillustrated motor. The laser array 50 is a vertical cavity surface emitting laser (VCSEL) in which a plurality of light emitting spots 54 are arrayed in two dimensions.

Figure 3:
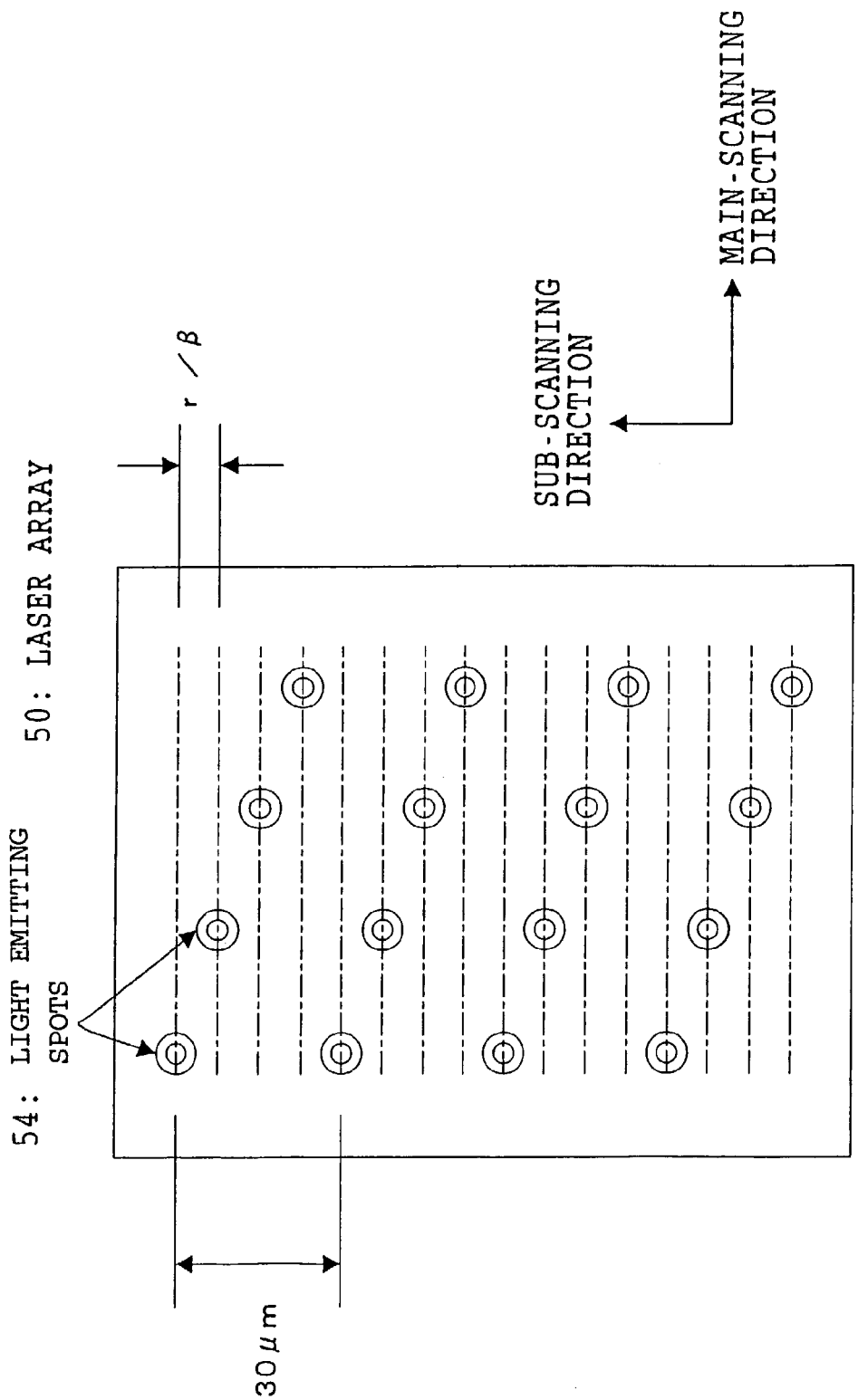
FIG. 3 is a plan view of a laser array.

FIG. 3 is a plan view of the laser array 50.

As shown in FIG. 3, at the laser array 50, sixteen of the light emitting spots 54 are disposed two-dimensionally with predetermined spacings. With a spacing which is a quarter of a separation between the light emitting spots 54 that are adjacent in the sub-scanning direction being a single step, the light emitting spots 54 are disposed to be displaced stepwise in the sub-scanning direction in single step amounts. That is, if viewed only with regard to the sub-scanning direction, the light emitting spots 54 are disposed one for one step. Because the light emitting spots 54 are disposed so as to be shifted stepwise in the sub-scanning direction, the light emitting spots 54 can all scan different scanning lines. Thus, this laser array 50 scans sixteen scanning lines simultaneously.

Herebelow, the number of beams that are scanned simultaneously by the laser array 50 is n. Further, the single step separation in the sub-scanning direction, that is, a spacing between adjacent beams, is $r/\beta$. Herein, $\beta$ is a projection magnification in the sub-scanning direction of the optical system of the optical scanning device 18. For example, in the case of the laser array 50 illustrated in FIG. 3, the number of beams n=16.

As shown in FIG. 2, light beams LB, which are modulated based on desired image data, are omitted from the respective light emitting spots 54 of the laser array 50. At a downstream side in a direction of progress of the plurality of light beams emitted from the respective light emitting spots 54, a collimator lens 56, an aperture 58, a cylinder lens 60 and a mirror 61 are disposed in this order. The plurality of light beams LB emitted from the respective light emitting spots 54 reach the polygon mirror 52 via the collimator lens 56, aperture 58, cylinder lens 60 and mirror 61.

The collimator lens 56 converts divergent light of the plurality of light beams LB emitted from the respective light emitting spots 54 to substantially parallel light, and the collimator lens 56 converges the light such that the respective beams LB intersect at a focusing point at an image side of the collimator lens 56 (a downstream side in the direction of progress of the light beams).

The aperture 58 is disposed at the image side focusing point of the collimator lens 56. The plurality of light beams LB that have been made to be substantially parallel by the collimator lens 56 are simultaneously smoothed by passing through the aperture 58. Note that, because all of the light beams LB intersect at the position of the aperture 58, shading of the beams by the aperture 58 is the same for all of the light beams LB.

The cylinder lens 60 has power only in the sub-scanning direction. After the plurality of light beams LB have been respectively converged in the sub-scanning direction by the cylinder lens 60, the plurality of light beams LB is reflected at the mirror 61 and guided to the polygon mirror 52.

The cylinder lens 60 is disposed such that an object side focusing point of the cylinder lens 60 (an upstream side in the direction of progress of the light beams) coincides with the position at which the aperture 58 is disposed, and such that an image side focusing point of the cylinder lens 60 falls on the reflection surfaces 52A of the polygon mirror 52.

Because the cylinder lens 60 is disposed thus, the laser array 50 and the reflection surfaces 52A of the polygon mirror 52 have an afocal and conjugative relationship in the sub-scanning direction. Accordingly, the plurality of light beams LB are imaged on the reflection surfaces 52A of the polygon mirror 52 in the form of a long line in the main scanning direction, and are mutually parallel in the sub-scanning direction. Moreover, the plurality of light beams LB are incident at the reflection surfaces 52A of the polygon mirror 52 at an angle in the sub-scanning direction with respect to the reflection surfaces 52A of the polygon mirror 52.

For the plurality of light beams incident at the polygon mirror 52, incidence angles thereof with respect to the respective reflection surfaces 52A are continuously varied and the light beams are deflected by the rotation of the polygon mirror 52. As a result, the plurality of light beams LB simultaneously scan the face of the photoreceptor 16 in the direction of an arrow E (the main scanning direction) while being irradiated thereto.

An f-θ lens 62 having power only in the main scanning direction is disposed in the direction of progress of the light beams LB reflected by the reflection surfaces 52A of the polygon mirror 52. The f-θ lens 62 is structured with a first lens 62A and a second lens 62B. Main scanning velocities of the respective light beams LB when the light beams are irradiated to the photoreceptor 16 are made to be equal velocities by the f-θ lens 62.

A first cylinder mirror 64A having power only in the sub-scanning direction is disposed at a downstream side in the direction of progress of the light beams from the f-θ lens 62. Further, a second cylinder mirror 64B having power only in the sub-scanning direction is disposed in a direction of reflection of the light beams LB from the first cylinder mirror 64A. The respective light beams LB are guided towards the photoreceptor 16 and imaged on the peripheral surface of the photoreceptor 16 by the first cylinder mirror 64A and second cylinder mirror 64B.

The first cylinder mirror 64A and second cylinder mirror 64B are disposed such that a position of an image side focusing point of the first cylinder mirror 64A and a position of an object side focusing point of the second cylinder mirror 64B coincide (such that an optical path length between the two mirrors is the sum of a focusing distance of the first cylinder mirror 64A and the focusing distance of the second cylinder mirror 64B). Consequently, the reflection surfaces 52A of the polygon mirror 52 and scanning positions at the peripheral surface of the photoreceptor 16 are make to have a relationship which is conjugative and afocal in the sub-scanning direction.

For an image-forming apparatus structured as described above, the number of beams n, a scanning line separation p and an interlaced scanning period i are specified as described below.

The effect of banding due to reciprocity law failures on density becomes smaller as the exposure time interval between scanning lines that neighbor one another in the sub-scanning direction becomes larger. If the exposure time interval is 100 μs (microseconds) or greater, the effect of the banding on image reproduction density is almost completely unobservable.

In general, the time interval for one main scan is 200 to 300 microseconds. Therefore, if the scanning timing between neighboring scanning lines is specified to be at least an interval with a duration of one main scan, the effects of reciprocity law failures are greatly alleviated. Accordingly, the image-forming apparatus relating to the first embodiment is structured as follows so as to reduce the effect of banding due to reciprocity law failures.

The image-forming apparatus relating to the first embodiment is provided with the laser array 50 with a number of beams n=16, and carries out interlaced scanning with a scanning line spacing p=21.2 μm and an interlaced scanning period i=3.

When a conventional image-forming apparatus carries out progressive scanning with a number of beams n=16 and a scanning line spacing p=21.2 μm, a period of image defects due to reciprocity failures (1/n·p) is 2.95 cycle/mm, and the image defects are obvious.

Figure 4:
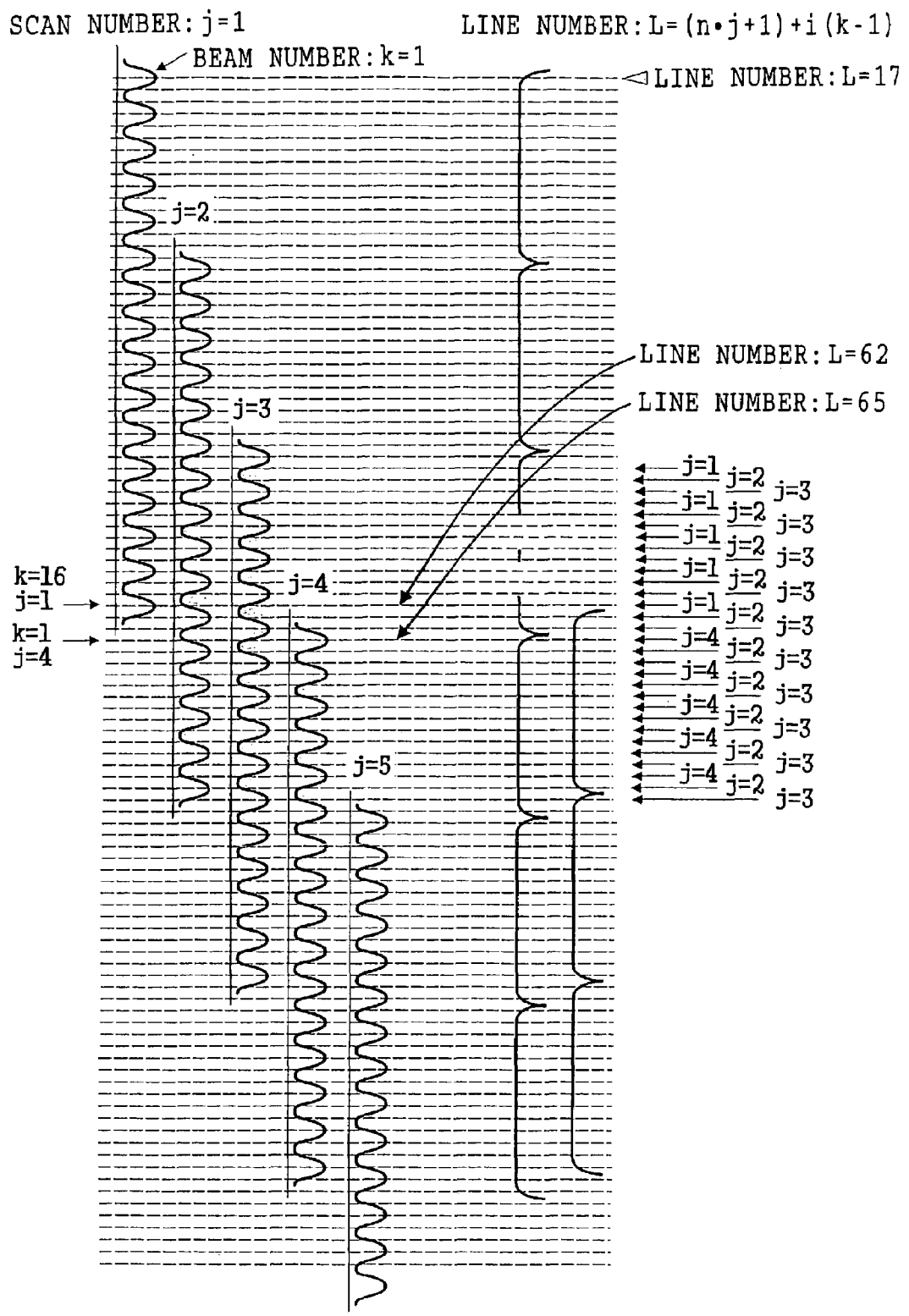
FIG. 4 is a diagram showing exposure energies and densities due to each of beams when a number of beams n=16, a scanning line spacing p=21.2 µm and an interlaced scanning period i=3.

FIG. 4 is a diagram showing exposure energies and densities caused by each beam when the number of beams n=16, the scanning line spacing p=21.2 μm and the interlaced scanning period i=3.

Because the image-forming apparatus relating to the present embodiment employs interlaced scanning as shown in FIG. 4, it is possible to specify such that, whatever combination of arbitrarily selected neighboring scan lines is taken, the neighboring scanning lines always form combinations with respectively different scan numbers j. Thus, the times between scans can be made to be the duration of one main scan or greater.

For example, in FIG. 4, the scanning line whose line number L=62 neighbors the scanning lines whose line numbers L=61 and 63. For the scanning lines with line numbers L=61, 62 and 63 the scan numbers j=3, 1 and 2, respectively. Therefore, the time interval between the scanning line with line number L=62 and the neighboring scanning lines is not less than the time for one main scan (200 to 300 μs). This holds for any selected line number L.

Consequently, this image-forming apparatus can greatly ameliorate image defects of banding due to reciprocity law failures, and can provide images in which image defects are unlikely to be noticed in practical use. Below, other examples of the present embodiment will be described.

Figure 5:
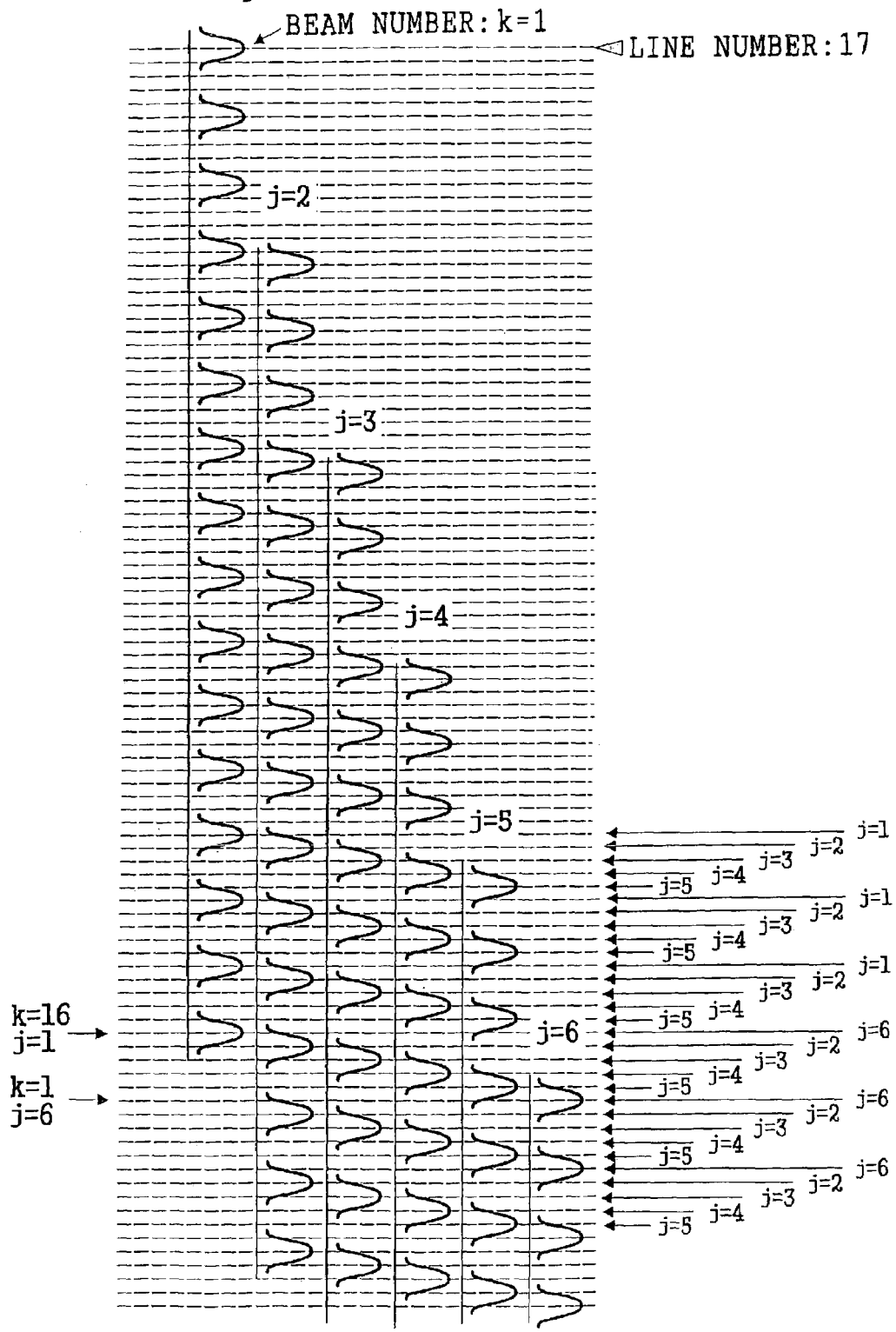
FIG. 5 is a diagram showing exposure energies and densities due to each of beams when a number of beams n=16, a scanning line spacing p=21.2 µm and an interlaced scanning period i=5.

FIG. 5 is a diagram showing exposure energies caused by each beam when the number of beams n=16, the scanning line spacing p=21.2 μm and the interlaced scanning period i=5.

Similarly, when interlaced scanning is employed, whatever combination of neighboring scan lines is taken, the neighboring scanning lines necessarily form combinations of different scan numbers. Therefore, the scanning intervals are not less than the duration of one main scan, and image defects of banding due to reciprocity law failures are hard to discern.

FIG. 6 is a diagram showing exposure energies caused by each beam when the number of beams n=32, the scanning line spacing p=10.6 μm and the interlaced scanning period i=3.

Similarly, when interlaced scanning is employed, whatever combination of neighboring scan lines is taken, the neighboring scanning lines always form combinations of different scan numbers. Therefore, the scanning intervals are not less than the duration of one main scan, and image defects of banding due to reciprocity law failures are hard to discern.

Note that when interlaced scanning is carried out by a multi-beam as described above, it is sufficient that the number n of laser beams and the interlaced scanning period i are relatively prime natural numbers. That is, the number of laser beams n and the interlaced scanning period i are not divisible by a common integer other than 1.

Thus, if an interlaced scanning period defined by a natural number i ($\geq 2$), which is a quotient when a spacing r between adjacent beams on the scanned surface is divided by the scanning line spacing p, is set to i, then, to prevent the problem of image defects due to reciprocity law failures it is necessary to carry out interlaced scanning in a case such that n and p satisfy the following equation (1):

$$1/n \cdot p \leq 3 \text{ cycle/mm} \qquad (1)$$

(1) Preferable Condition 1 for Number of Beams n and Interlaced Scanning Period i FIG. 7 is a table showing conditions of the number of lasers n and the interlaced scanning period i when interlaced scanning is to be set up. If the number of lasers n is larger than in FIG. 7, when the number of lasers n is 16 or 32, interlaced scanning can be set up with i=3, 5, 7, 9, 11, 13, 15, 17, 19 . . . .

In the aforementioned FIG. 4, the number of laser beams is specified to be n=16, the spacing of beams on the scanned surface r=63.6 μm and the scanning line spacing p=21.2 μm, and the interlaced scanning period i=(r/p)=3. At this time, because the number of beams n and the interlaced scanning period i are relatively prime natural numbers, interlaced scanning can be established.

Herein, it is preferable that a relationship between the number of beams n and the interlaced scanning period i satisfy the condition i<n. This will be explained using FIGS. 4 and 8.

Figure 8:
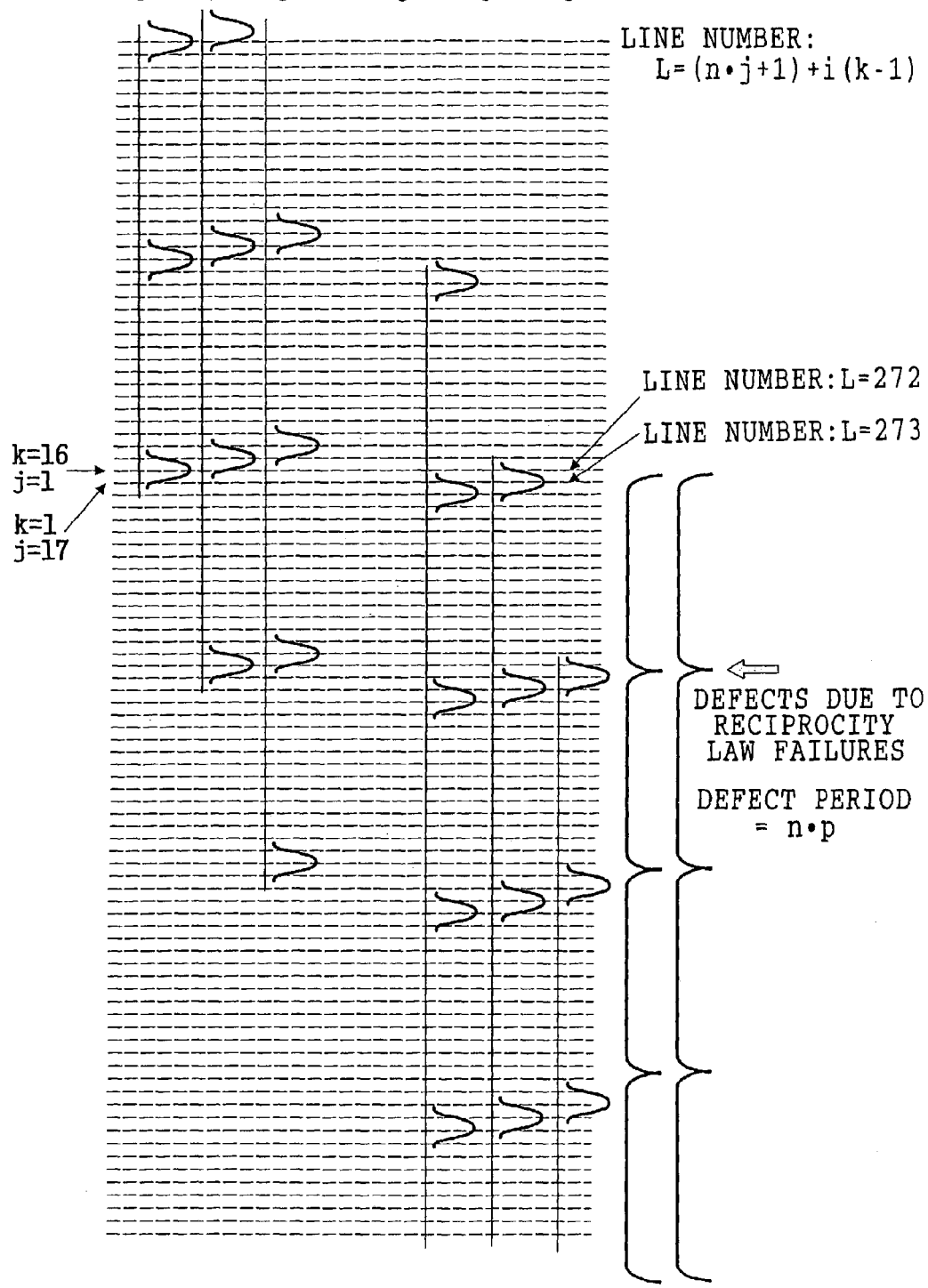
FIG. 8 is a diagram showing exposure energies and densities due to each of beams when a number of beams n=16 and an interlaced scanning period i=17.

FIG. 8 is a diagram showing exposure energies and densities caused by each beam when the number of beams n=16 and the interlaced scanning period i=17.

In comparison with the image-forming apparatus with the conditions shown in FIG. 8, the image-forming apparatus with the conditions shown in FIG. 4 can suppress variations of the scanning line spacing in the sub-scanning direction due to magnification errors, and a more excellent image can be provided.

Now, in the image-forming apparatus with the conditions shown in FIG. 8, the spacing between adjacent beams r and the scanning line spacing p are specified as follows.

r=360.4 μm p=21.2 μm

In this case, a spacing between a 1st laser beam and a 16th laser beam is 5.4 mm (=(16−1)×360.4). If a magnification error in the sub-scanning direction is 0.3%, then a variation in position of the 16th laser beam relative to the 1st laser beam will be 16.2 μm. That is, the position of the 16th laser beam will be shifted by 50% or more of the scanning line spacing, and the image will be adversely affected.

In contrast, in the image-forming apparatus with the conditions shown in FIG. 4, the spacing between adjacent beams r and the scanning line spacing p are specified as follows.

r=63.6 μm p=21.2 μm

In this case, a spacing between a 1st laser beam and a 16th laser beam is 0.954 mm (=(16−1)×63.6). If a magnification error in the sub-scanning direction is 0.3%, then a variation in position of the 16th laser beam relative to the 1st laser beam will be 2.86 μm. That is, the position of the 16th laser beam will be shifted by 13.5% of the scanning line spacing, and the image will not be adversely affected.

Thus, if the image-forming apparatus is specified such that the number of beams n and the interlaced scanning period i are relatively prime natural numbers and such that i<n, an image with little image deterioration can be formed.

(2) Preferable Condition 2 for Number of Beams n and Interlaced Scanning Period i In a case of interlaced scanning with number of beams n and interlaced scanning period i, all scanning lines are scanned without overwriting by i cycles of scanning. Thus, with a combination of n and i for which $\{i \cdot (n-1)+1\}$ can be divided by the number of beams n (with remainder zero), the n-th beam of scan number j=i and the first beam of scan number j=i+1 scan neighboring scanning lines.

For example, in the conditions shown in FIG. 8 (n=16, i=17), n and i are a combination in which $\{i \cdot (n-1)+1\}$ can be divided by the number of beams n. Thus, the 16th beam for scan number j=1 and the first beam for scan number j=i+1=17 scan neighboring scanning lines.

Accordingly, for scanning with n=16 and i=17, an effect of reciprocity law failures due to a leading beam and a final trailing beam, although slight, is present between the aforementioned pair of scanning lines. Specifically, in FIG. 8, this effect occurs between the scanning line numbers L=272 and L=273. Therefore, the effect of scanning law failures is accentuated, and an image quality defect will occur.

In contrast, with the conditions shown in FIG. 4 (n=16, i=3), n and i are a combination in which $\{i \cdot (n-1)+1\}$ does not divide by the number of beams n (with remainder zero). In this case, the 16th beam for scan number j=1 scans line number L=62, and the first beam for scan number j=i+1=4 scans line number L=65.

Accordingly, for scanning with n=16 and i=3, the effect of reciprocity law failures due to the leading beam and the final trailing beam does not occur between this pair of scanning lines. Therefore, the effect of reciprocity law failures is not accentuated, and the image quality defect will not occur.

Thus, if the image-forming apparatus is specified such that the number of beams n and the interlaced scanning period i are relatively prime natural numbers and such that the remainder when $\{i \cdot (n-1)+1\}$ is divided by the number of beams n is not zero, in other words, such that a remainder when $\{i \cdot (n-1)+1\}$ is divided by the number of beams n is less than n, then the effects of reciprocity law failures will not reinforced, and images without image quality defects can be formed.

(3) Preferable Conditions of Beam Diameter d and Beam Spacing r

Figure 9:
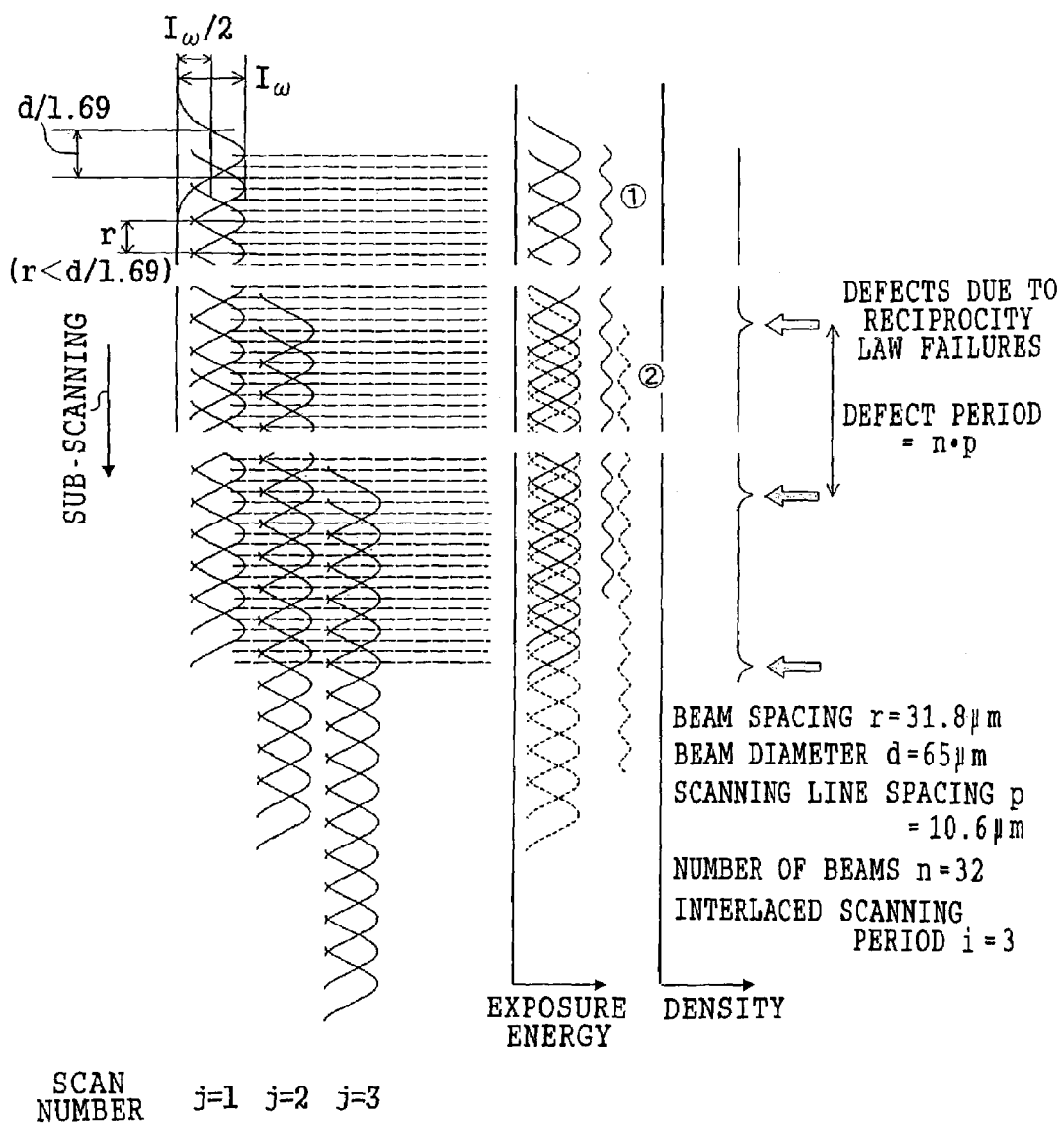
FIG. 9 is a diagram for explaining a problem of the conventional art, and shows exposure energies and densities due to each of beams when a number of beams n=32, a beam spacing r=31.8 µm, a beam diameter d=65 µm, a scanning line spacing p=10.6 µm and an interlaced scanning period i=3.

FIG. 9 is a diagram for explaining a conventional problem, and is a diagram showing exposure energies and densities due to each beam when the number of beams n=32, the beam spacing r=31.8 μm, the beam diameter d=65 μm, the scanning line spacing p=10.6 μm and the interlaced scanning period i=3. That is, FIG. 9 expresses states of density fluctuation and a relationship between intervals, in the scanning direction, between neighboring beams on the scanning surface and the beam diameter d in the scanning direction. Note that the beam diameter d is a diameter of the beam for intensities of $1/e^2$ of the peak intensity.

When the image-forming apparatus carries out interlaced scanning under the conditions shown in FIG. 4 with the interlaced scanning period i ($\geq 2$), an image in which density irregularities caused by reciprocity law failures are difficult to discern can be provided.

In contrast, with the image-forming apparatus under the conditions shown in FIG. 9, when the overlap between neighboring beams is large, an image in which density fluctuations due to reciprocity law failures are likely to occur will be provided.

Here, in a case in which the number of beams is set to n and the beam spacing is narrower than a beam diameter for half of maximum intensity (=d/1.70), a distribution of energy due to exposure for a single cycle of scanning is a distribution as shown in FIG. 9, and the energy amounts provided at reciprocity law failures will be large. As a result, density fluctuations (defects due to reciprocity law failures) will appear at periods of n multiplied by the scanning line spacing p.

On the other hand, in a case in which the beam spacing r is greater than the beam diameter d (r>d), overlapping of neighboring beams is small. Therefore, energy amounts supplied at reciprocity law failures are smaller, and density fluctuations are less likely to be obvious. However, as the interlaced scanning period becomes larger and the beam spacing r becomes wider, a problem occurs in that, as described earlier, a rate of displacement of scanning line spacings in the sub-scanning direction due to magnification errors becomes larger. Major causes of such magnification errors in the sub-scanning direction are production errors of the optical system, variations in lens power due to temperature variations, and the like.

Figure 10:
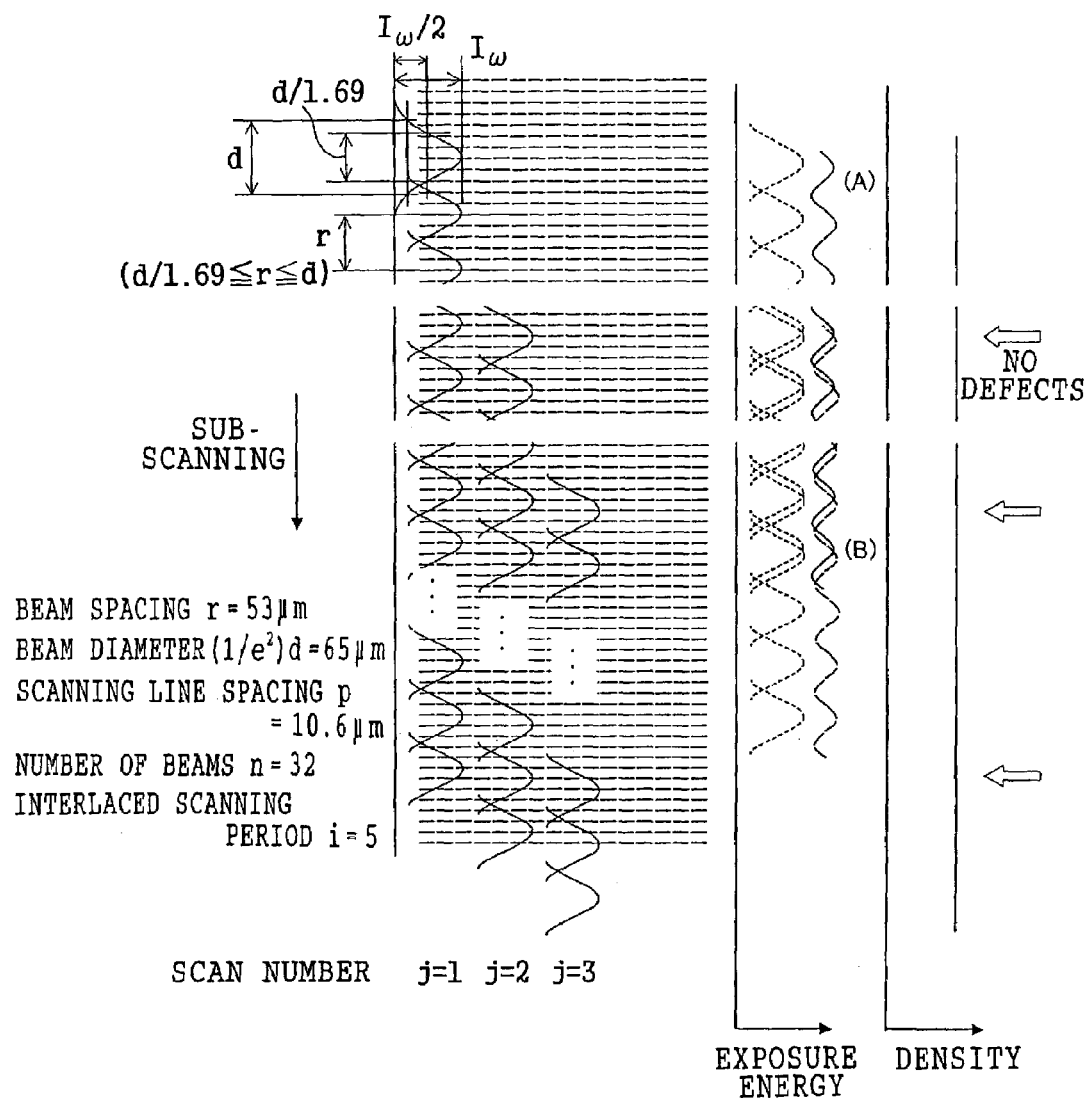
FIG. 10 is a diagram showing exposure energies and densities due to each of beams when a number of beams n=32, a beam spacing r=53 µm, a beam diameter d=65 µm, a scanning line spacing p=10.6 µm and an interlaced scanning period i=5.

FIG. 10 is a diagram showing exposure energies and densities due to each beam when the number of beams n=32, the beam spacing r=53 μm, the beam diameter d=65 μm, the scanning line spacing p=10.6 μm and the interlaced scanning period i=5.

In an image-forming apparatus with the conditions shown in FIG. 10, the beam spacing r is wider than the beam diameter for half of maximum intensity (=d/1.70), and the following equation (2) is satisfied.

$$d/1.70 \leq r \leq d \quad (2)$$

In this case, overlaps between neighboring beams are small, and the distribution of energies exposed in one cycle of scanning is as shown at (A) of FIG. 10. Consequently, in such an image-forming apparatus, energy amounts supplied at reciprocity law failures are made smaller. Therefore, density fluctuations are smaller than in the case of FIG. 9, and a high quality image can be provided.

Moreover, because the beam diameter is made smaller than the beam diameter d, a spacing between a 1st laser beam and a 32nd laser beam, being 1.643 mm (=(32−1)× 53.0), can be made narrower. If a magnification error in the sub-scanning direction is 0.3%, a variation in position of the 32nd laser beam relative to the 1st laser beam is 4.9 μm, and thus can be reduced to 50% of the scanning line spacing or less.

Figure 11:
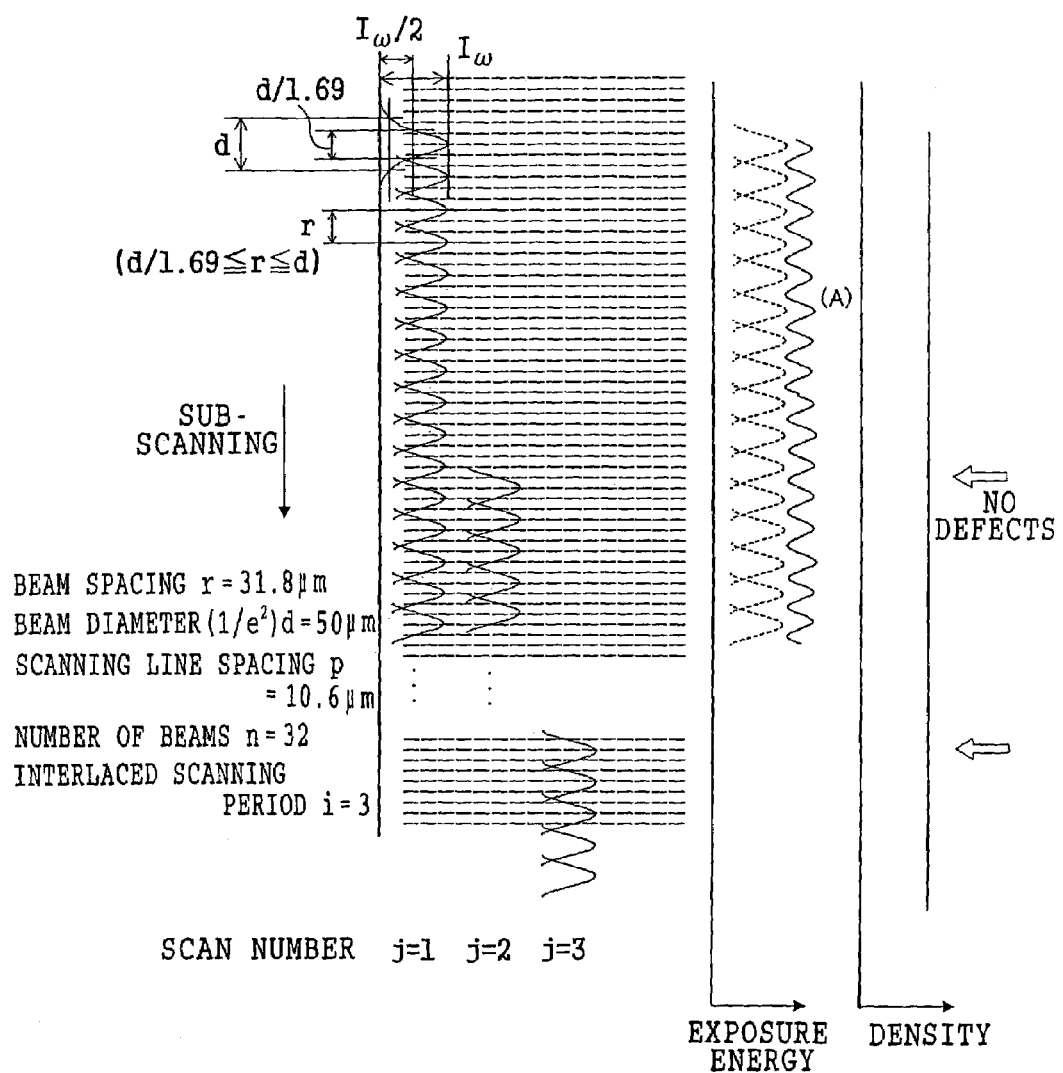
FIG. 11 is a diagram showing exposure energies and densities due to each of beams when a number of beams n=32, a beam spacing r=31.8 µm, a beam diameter d=50 µm, a scanning line spacing p=10.6 µm and an interlaced scanning period i=3.

FIG. 11 is a diagram showing exposure energies and densities due to each beam when the number of beams n=32, the beam spacing r=31.8 μm, the beam diameter d=50 μm, the scanning line spacing p=10.6 μm and the interlaced scanning period i=3.

In an image-forming apparatus with the conditions shown in FIG. 11, the beam spacing r is wider than the beam diameter for half of maximum intensity (=d/1.70), and the aforementioned equation (2) is satisfied. In this case, overlaps between neighboring beams are small, and the distribution of energies exposed in one cycle of scanning is as shown at (A) of FIG. 11. Consequently, in such an image-forming apparatus, energy amounts supplied at reciprocity law failures are made smaller. Therefore, density fluctuations are smaller than in the case of FIG. 9, and a high quality image can be provided.

Accordingly, by specifying the image-forming apparatus such that a relationship between a spacing between adjacent beams r and beam diameters d satisfies equation (2), density fluctuations can be made smaller and images with high image quality can be formed.

Second Embodiment

Now, a second embodiment of the present invention will be described. Note that portions that are the same as in the embodiment described above are given the same reference numerals, and detailed descriptions thereof are omitted.

Similarly to the first embodiment, an image-forming apparatus relating to the second embodiment is structured as shown in FIGS. 1 to 3.

Figure 12:
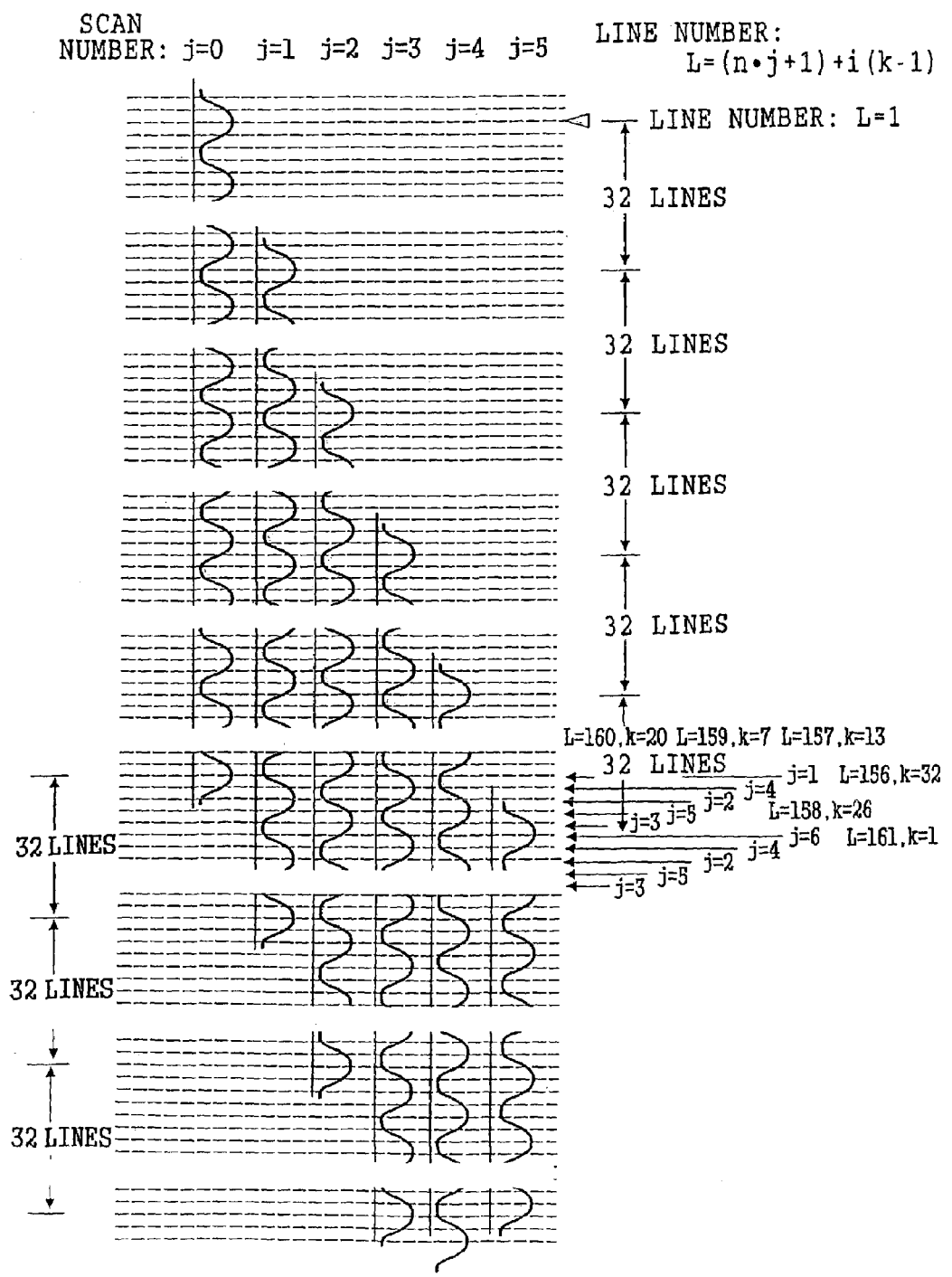
FIG. 12 is a diagram showing exposure energies due to each of beams when a number of beams n=32 and an interlaced scanning period i=5.

FIG. 12 is a diagram showing exposure energies due to each beam when the number of beams n=32 and the interlaced scanning period i=5.

For scanning lines that are scanned all together in one scan, if a scan number is j, a beam number is k, and the interlaced scanning period is i, then the number of a scanning line L is provided by the following equation (3). Equation (3) is described in, for example, JP-A No. 8-292384.

$$L = (n \cdot j + 1) + i \cdot (k-1) \quad (3)$$

A length in the sub-scanning direction that is scanned altogether in one scan is obtained by fixing n=32, j=0 and i=5 in equation 3, and varying k from 1 to 32. For example, if n=32, j=0, i=5 and k=1 to 32, the line number of a leading scan when k=1 is L=line 1, and for a final trailing scan when k=32, L=line 156.

For scanning with the interlaced scanning period i=5, all lines are scanned by five cycles of scanning, without gaps between the lines and without overwriting. Therefore, a next set of scans after j=0 starts with j=5, and the i-th line after line number L=156, which is scanned by the beam of j=0, k=32, is scanning line L=161 for j=5, k=1. Therefore, the scanning length in the sub-scanning direction is the 155 lines from j=0, k=1 to j=0, k=32 plus an amount corresponding to 5 lines, making 160 lines. This is equal to a length of the number of beams n multiplied by the interlaced scanning period i and the scanning line separation p. Herebelow, this length n·i·p is referred to as a "scanning line length".

Figure 24:
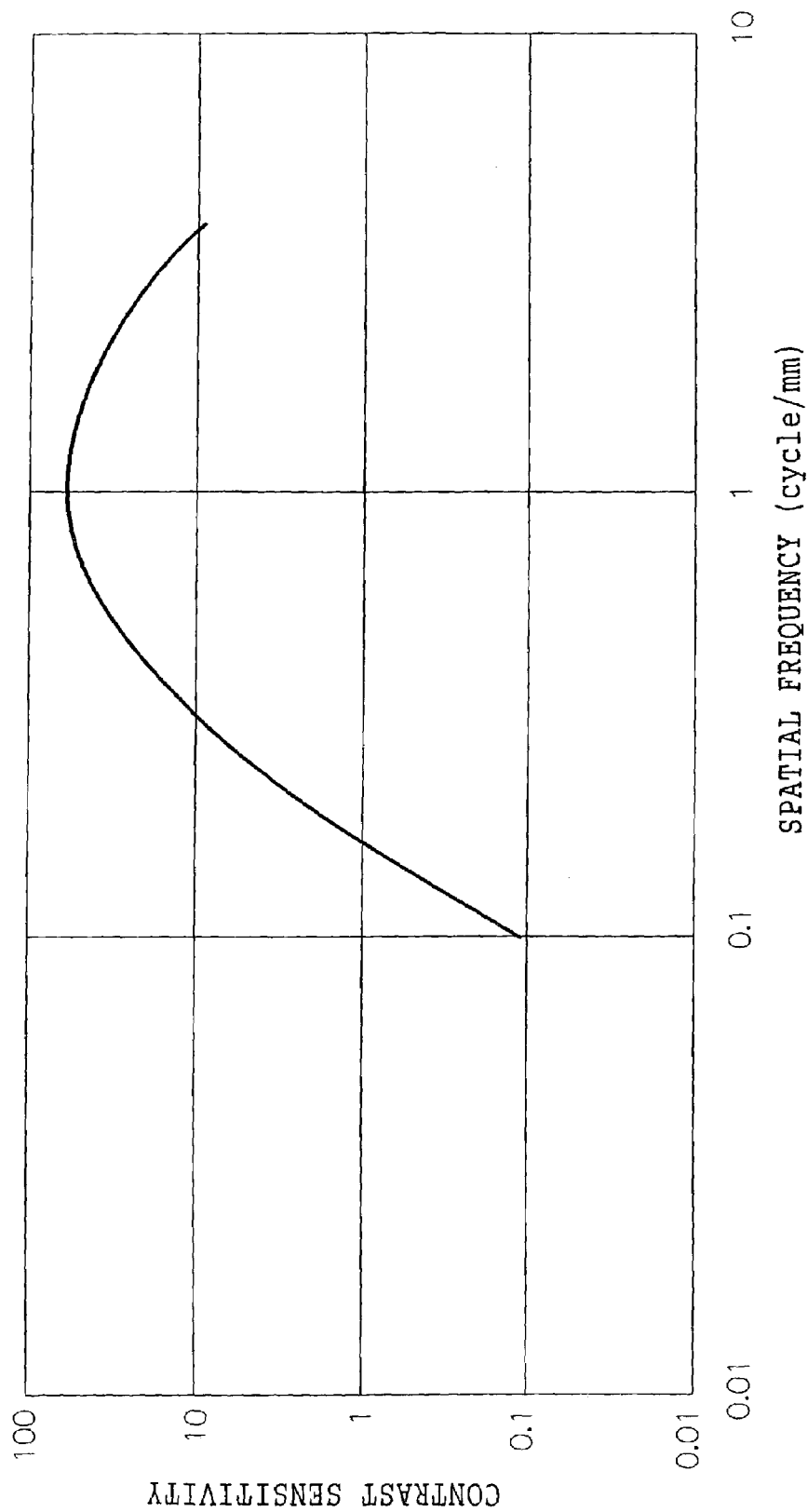
FIG. 24 is a diagram showing a characteristic of contrast density at the human eye against spatial frequency.

Because scans are carried out simultaneously over the scanning line length, conditions for the occurrence of banding due to reciprocity law failures are uniform. When such scanning recurs in the sub-scanning direction, the region in which the conditions for generating reciprocity law failures are uniform is repeated for each scanning line length. Hence, if the spatial frequency of this repetition is 0.4 cycles/mm or less, then, as is shown in FIG. 24, the regions have low contrast in the VTF of the human eye.

For example, if the number of beams n=32, the interlaced scanning period i=5 and the scanning line spacing p=0.0212 mm, the recursion has a period of n·i·p=3.39 mm, and the spatial frequency is 0.29 cycle/mm. With an image-forming apparatus under such conditions, image defects of banding due to reciprocity law failures are hard to discern at the human eye, and high quality images can be provided.

As described above, the image-forming apparatus relating to the second embodiment is specified such that a relationship between the number of beams n, the scanning line spacing p and the interlaced scanning period i satisfies the following equation:

$$1/(n \cdot p \cdot i) \leq 0.4 \text{ cycle/mm}$$

Therefore, it is possible to make image defects of banding due to reciprocity law failures unlikely to be discerned at the human eye, and images with high image quality can be formed.

Third Embodiment

Now, a third embodiment of the present invention will be described. Note that portions that are the same as in the embodiments described above are given the same reference numerals, and detailed descriptions thereof are omitted.

Similarly to the first embodiment, an image-forming apparatus relating to the third embodiment is structured as shown in FIGS. 1 to 3.

Figure 13:
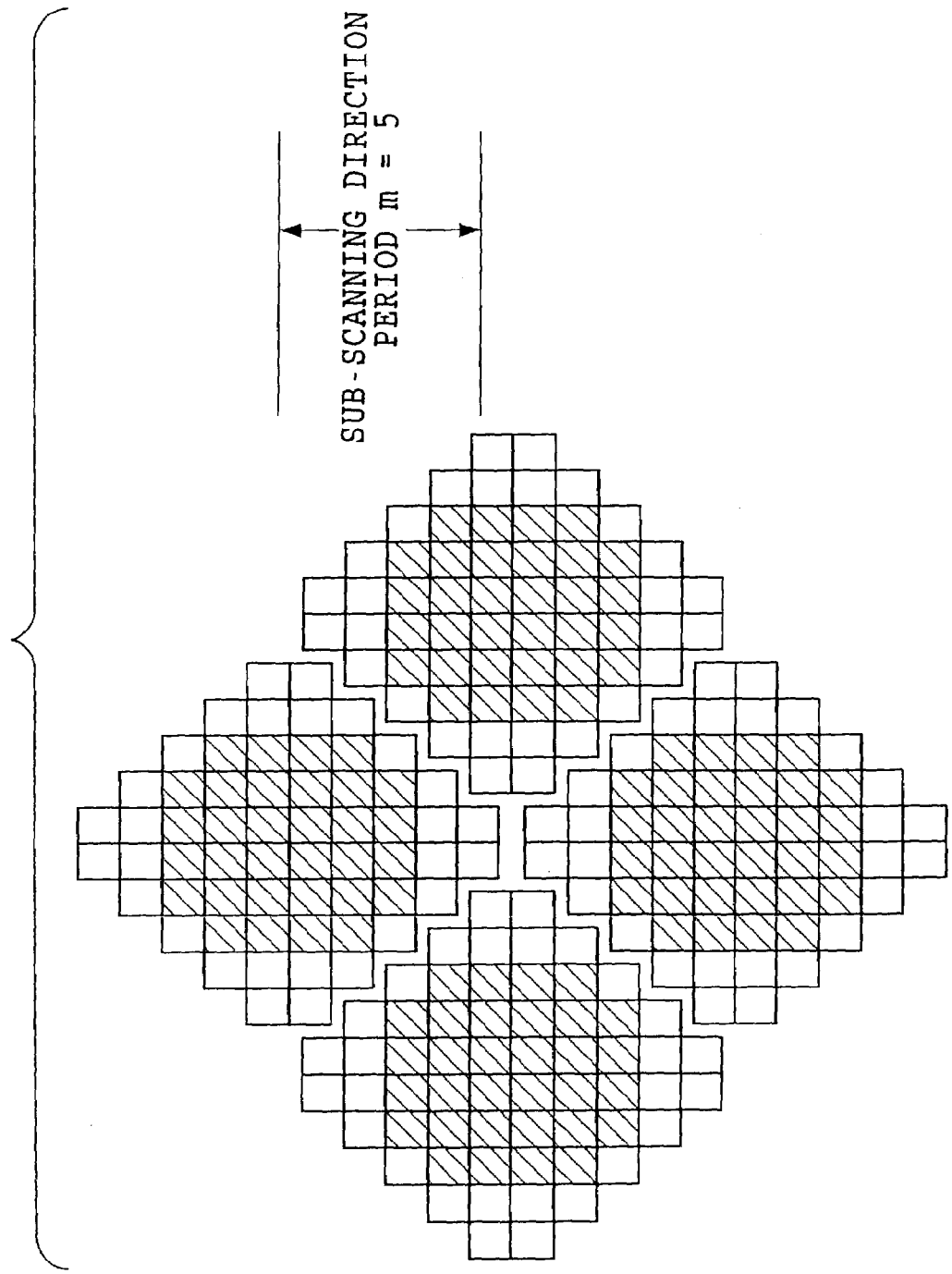
FIG. 13 is a diagram showing a halftone screen for grayscale reproduction.

FIG. 13 is a diagram showing a halftone screen for grayscale reproduction. This halftone screen is a 32nd level of 60 levels, with a screen angle of 45° and a sub-scanning direction period m=5. Dark portions of the drawing are positions which are exposed by light, and are colored by an unillustrated image-forming apparatus. Here, a repetition period in the sub-scanning direction of an image is m=5, and recursion of the screen pattern in the sub-scanning direction is generated with a period length of m multiplied by the scanning line separation p.

Next, a case in which an image-forming apparatus outputs a halftone image using this halftone screen will be described.

Figure 14:
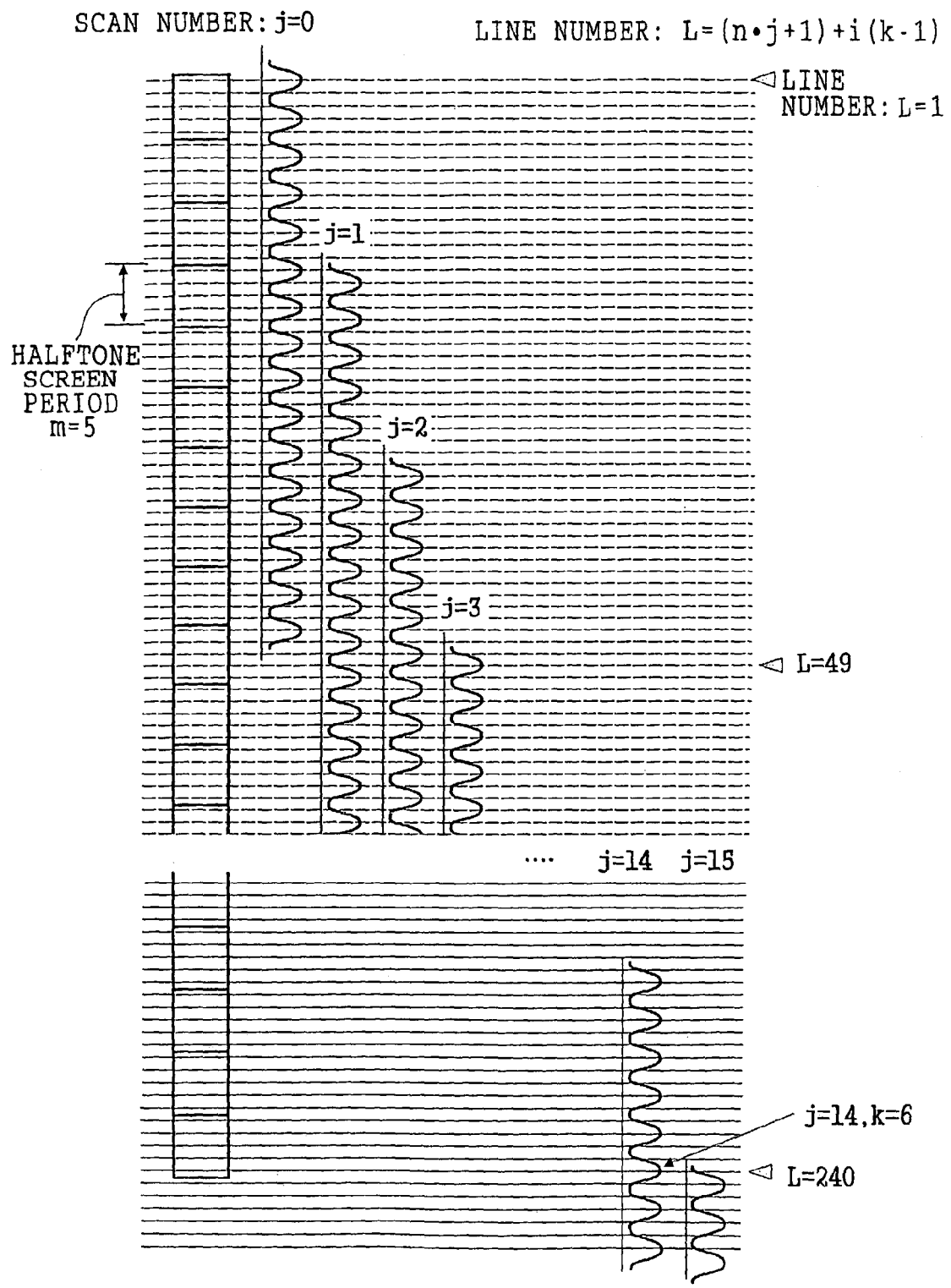
FIG. 14 is a diagram showing exposure energies due to each of beams when a halftone screen in which a period of repetition in a sub-scanning direction m=5 is utilized.

FIG. 14 is a diagram showing exposure energies due to each beam when this halftone screen having a repetition period in the sub-scanning direction m=5 is utilized.

In a case in which the number of beams n=16, the scanning line spacing p=0.0212 mm and the interlaced scanning period i=3, a period of image defects due to reciprocity law failures when interlaced scanning is employed is n·i·p=1.0176 mm, and spatial frequency thereof is 0.98 cycles/mm.

Here, when the halftone screen whose repetition period in the sub-scanning direction m=5 is utilized for halftone reproduction, moire is generated in the halftone image by interference of a period of scanning lines n·i and a period of scanning lines m, as shown in FIG. 14. If the period of this moire, which is a minimum common product of n, i and m, is E=240, the moire period is provided by E·p. For example, if the scanning line separation in the sub-scanning direction is set to p=0.0212 mm, E·p=240×0.0212=5.088 mm.

The spatial frequency of this repetition is 0.1965 cycle/mm. Thus, by suitably specifying n, i and m, the spatial frequency can be specified to be not more than 0.4 cycle/mm in the characteristic of spatial frequency versus contrast sensitivity of the human eye that is shown in FIG. 24 (the eye's VTF). This value demarcates a range in which the spatial frequency of banding is less likely to be discerned at the human eye as image defects. As a result of the specification mentioned above, image defects of banding due to reciprocity law failures will be harder for the eye to recognize, and high image quality can be achieved.

Next, a case in which an image-forming apparatus outputs a halftone image using another halftone screen will be described.

Figure 15:
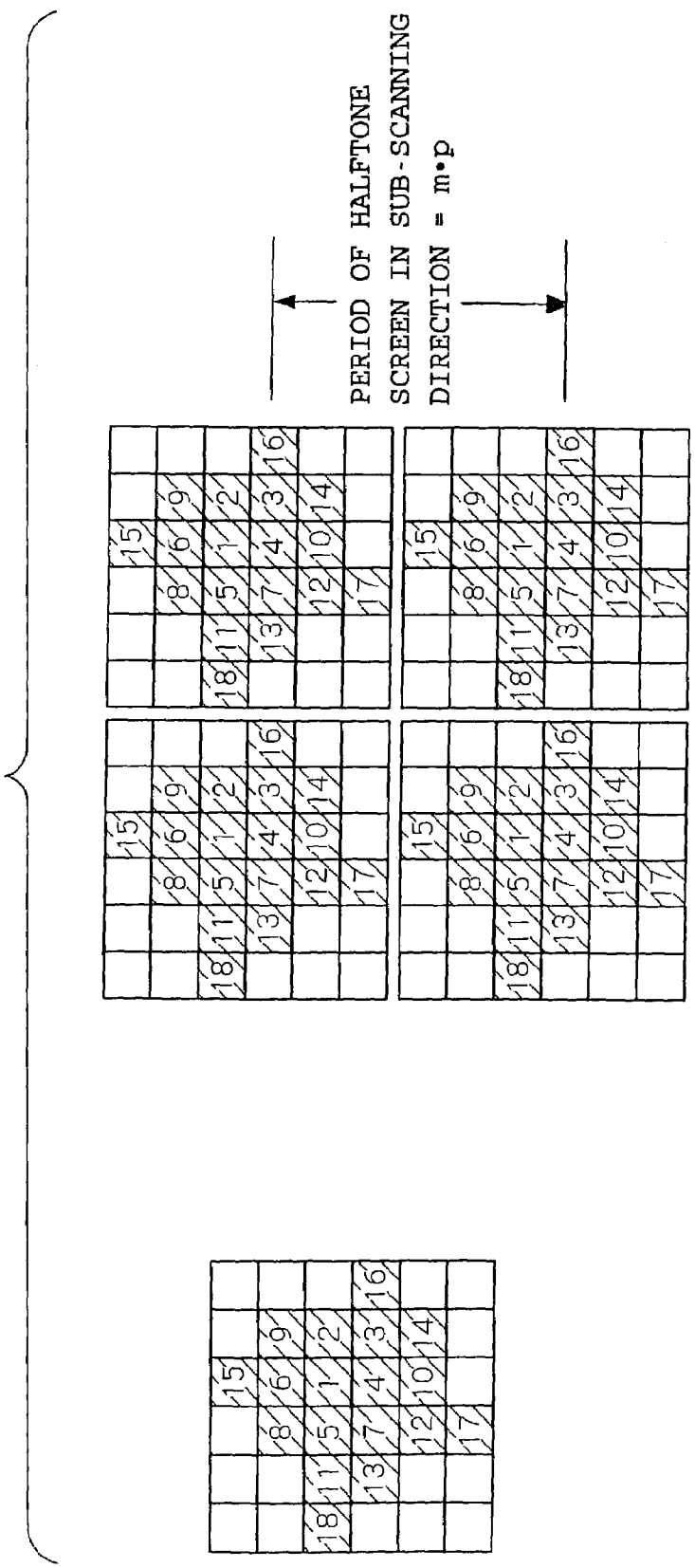
FIG. 15 is a diagram showing a halftone screen for grayscale reproduction.

FIG. 15 is a diagram showing a halftone screen for halftone reproduction. This halftone screen is an 18th level of 36 levels, with a screen angle of 0° and a period in the sub-scanning direction m=6.

Figure 16:
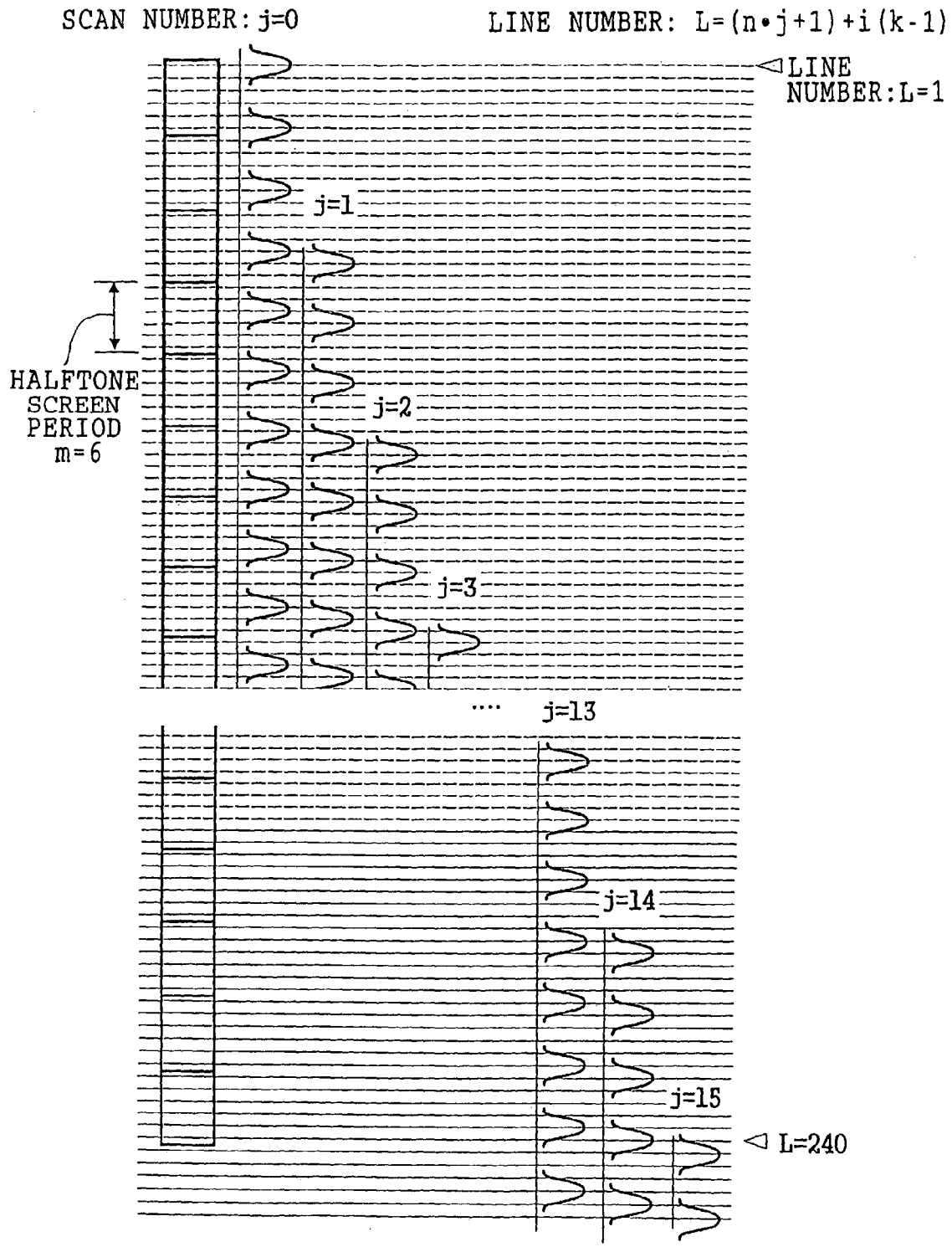
FIG. 16 is a diagram showing exposure energies due to each of beams when a halftone screen in which a repetition period in a sub-scanning direction m=6 is utilized.

FIG. 16 is a diagram showing exposure energies due to each beam when this halftone screen having a repetition period in the sub-scanning direction m=6 is utilized.

Here, the number of beams n=16, the interlaced scanning period i=5 and the repetition period in the sub-scanning direction m=6, and the smallest common product of these E=240. If the scanning line spacing in the sub-scanning direction p=0.0212 mm, the product E·p=240×0.0212=5.088 mm, and the spatial frequency of repetitions is 0.1965 cycle/mm. As a result, the spatial frequency of banding due to reciprocity law failures is in the range up to 0.4 cycle/mm, in which such banding is hard for the human eye to discern as image defects.

Therefore, with an image-forming apparatus in which the above conditions are specified, a state in which image defects are unlikely to be recognised at the human eye is made possible, and high quality images can be provided.

As described above, the image-forming apparatus relating to the third embodiment is specified such that, with the number of beams n, the scanning line spacing p and the interlaced scanning period i, a period of recursion in the sub-scanning direction of the image is m times the scanning line spacing p, and the smallest common product E of m, n and i satisfies the following equation:

$$1/(E·p) \leq 0.4 \text{ cycle/mm}$$

Thus, image defects of banding due to reciprocity law failures can be made hard to discern at the human eye, and a high quality image can be formed.

Fourth Embodiment

Now, a fourth embodiment of the present invention will be described. Note that portions that are the same as in the embodiments described above are given the same reference numerals, and detailed descriptions thereof are omitted.

Similarly to the first embodiment, an image-forming apparatus relating to the fourth embodiment is structured as shown in FIGS. 1 to 3.

Figure 17:
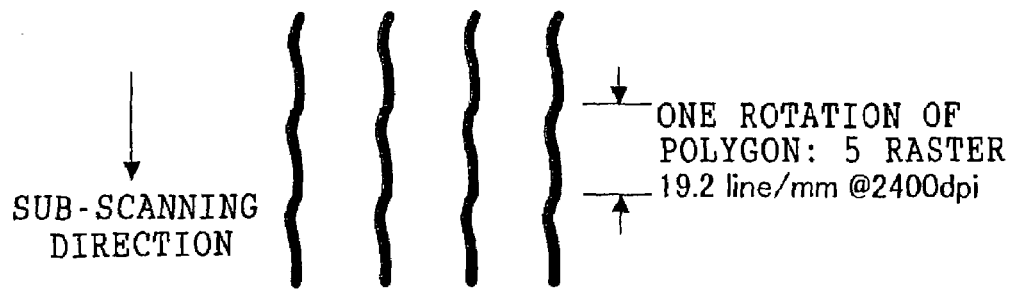
FIG. 17 is a diagram showing disturbance of image lines extending in a sub-scanning direction when a deflection device of a scanning optical system has periodicity.

FIG. 17 is a diagram showing disturbance of image lines extending in the sub-scanning direction when a deflection device of the scanning optical system has periodicity. Here, an example in which there is one scanning line beam and the number of facets of the polygon mirror 52 q=5 is illustrated.

From FIG. 17, it is observed that disturbance of the image with a period of five scanning lines in the sub-scanning direction is generated. This is because, when the polygon mirror 52 is utilized for the deflection device, differences in deflection directions of the mirror surfaces occur when flatness of the mirrors is poor, and oscillations in the main scanning direction of scanning positions are generated.

Accordingly, in the image-forming apparatus relating to the present embodiment as described below, an image can be provided in which, even in a case in which reproduction of halftones is carried out using a deflection device that generates image disturbances as described above at a scanning optical system with a plurality of beams, defects of the image are hard to discern.

For example, in a case in which the number of beams n=32, the interlaced scanning period i=3, and the number of facets of the polygon mirror 52 q=5, banding due to reciprocity law failures is reinforced for each occurrence of a smallest common product of n, i and q, which is F=480.

Accordingly, if the scanning line spacing in the sub-scanning direction p=0.0106 mm, F·p=480×0.0106=5.09 mm, and the spatial frequency of repetitions is 0.197 cycle/mm.

Therefore, in an image-forming apparatus in which the above conditions are specified, a spatial frequency of banding due to reciprocity law failures can be set to the range in which the banding is hard for the human eye to discern as image defects, and high quality images can be provided.

Furthermore, in the image-forming apparatus relating to the present embodiment, the following conditions may be specified.

For example, in a case in which the number of beams n=32, the interlaced scanning period i=5 and the number of facets of the polygon mirror 52 q=6, for each occurrence of F=480 lines, which is the smallest common product of n, i and q, banding due to reciprocity law failures is accentuated.

Accordingly, if the scanning line spacing in the sub-scanning direction p=0.0106 mm, F·p=480×0.0106=5.09 mm, and the spatial frequency of repetitions is 0.197 cycle/mm.

Therefore, in an image-forming apparatus in which the above conditions are specified, the spatial frequency of banding due to reciprocity law failures can be set to the range in which the banding is hard for the human eye to discern as image defects, and high quality images can be provided.

As described above, the image-forming apparatus relating to the fourth embodiment is specified such that the number of beams n, the scanning line spacing p, the interlaced scanning period i, the number of facets of the polygon mirror 52 which is a deflection device q, and the smallest common product F of n, q and i, satisfy the following equation:

$$1/(F·p) \leq 0.4 \text{ cycle/mm}$$

Thus, image defects of banding due to reciprocity law failures can be made hard to discern at the human eye, and a high quality image can be formed.

Fifth Embodiment

Now, a fifth embodiment of the present invention will be described. Note that portions that are the same as in the embodiments described above are given the same reference numerals, and detailed descriptions thereof are omitted.

Similarly to the first embodiment, an image-forming apparatus relating to the fifth embodiment is structured as shown in FIGS. 1 to 3.

Figure 18:
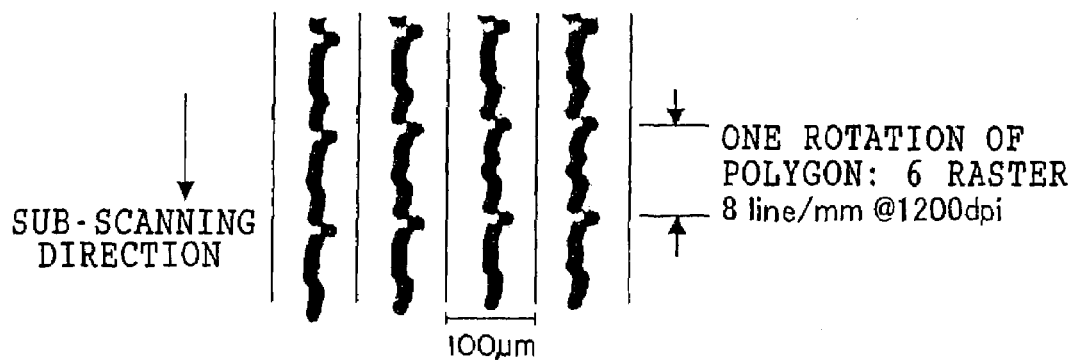
FIG. 18 is a diagram showing disturbance of image lines extending in a sub-scanning direction when a deflection device of a light-scanning optical system has periodicity.

FIG. 18 is a diagram showing disturbances of image lines extending in the sub-scanning direction when a deflection device of the scanning optical system has periodicity. Here, an example in which there is one scanning line beam and the number of facets of the polygon mirror 52 q=6 is illustrated.

From FIG. 18, it is observed that disturbance of the image with a period of six scanning lines in the sub-scanning direction is generated. This is because, similarly to the fourth embodiment, when the polygon mirror 52 is utilized for the deflection device, differences in deflection directions of the mirror surfaces occur when flatness of the mirrors is poor, and oscillations in the main scanning direction of scanning positions is generated.

Accordingly, in the image-forming apparatus relating to the present embodiment as described below, an image can be provided in which, even in a case in which reproduction of halftones is carried out using a deflection device that generates image disturbances as described above at a scanning optical system with a plurality of beams, defects of the image are hard to discern.

Figure 19:
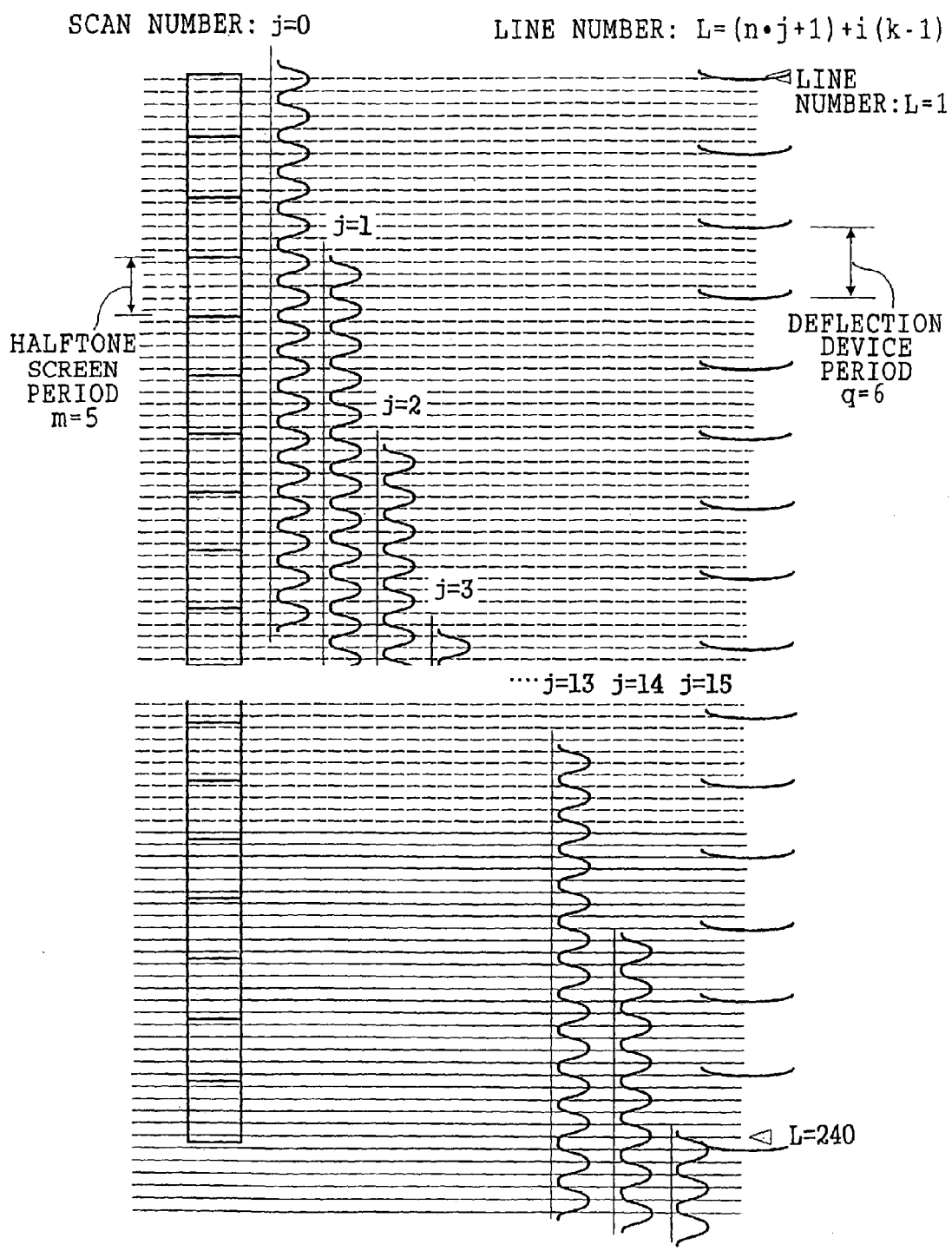
FIG. 19 is a diagram showing exposure energies due to each of beams when a number of beams n=16, an interlaced scanning period i=3, a halftone period m=5 and a number of facets of a polygon mirror q=6.
Figure 20:
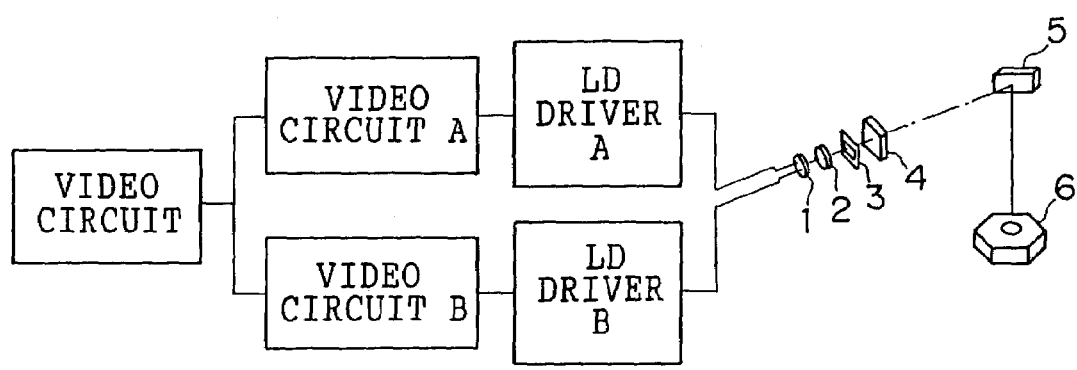
FIG. 20 is a block diagram showing an example of a driving circuit for a multi-spot laser diode.
Figure 23A:
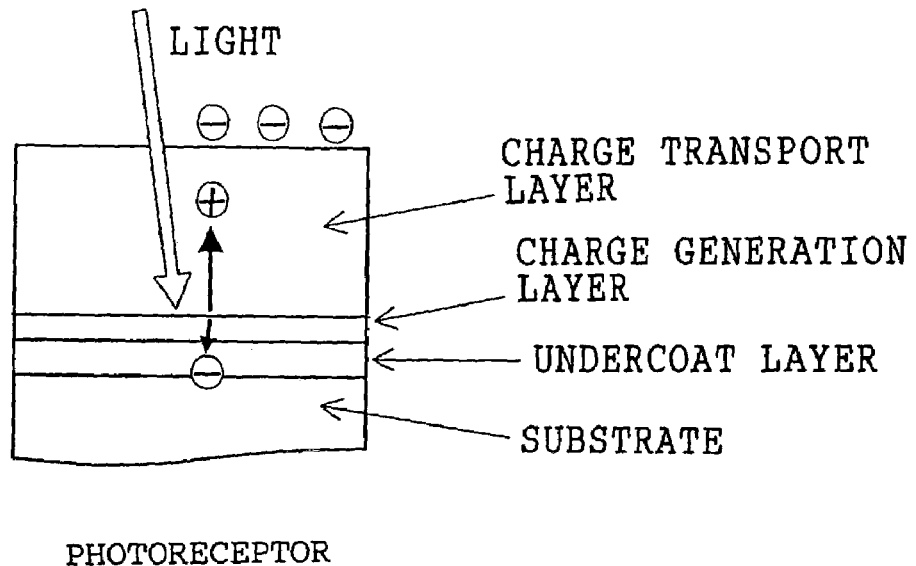
FIG. 23A is a diagram for explaining reciprocity law failures, and shows states of electrons and a positive hole when light is irradiated to a photoreceptor.
Figure 23B:
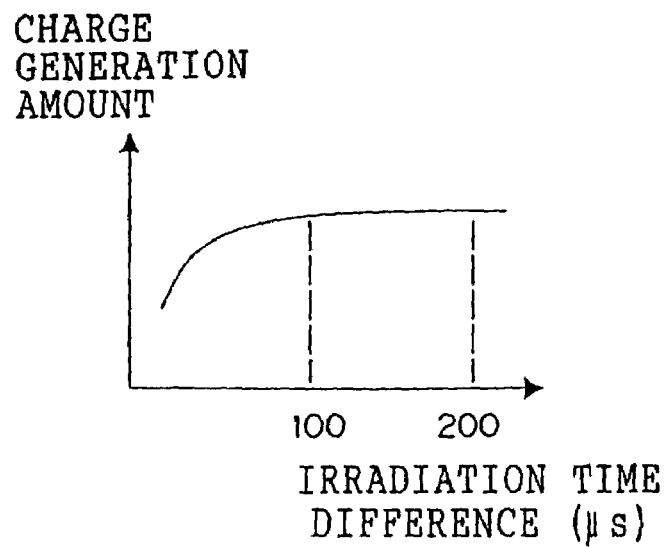
FIG. 23B is a diagram showing charge generation amounts in relation to irradiation time differences.

FIG. 19 is a diagram showing exposure energies due to each beam when the number of beams n=16, the interlaced scanning period i=3, a halftone period m=5 and the number of facets of the polygon mirror 52 q=6.

Firstly, image defects due to reciprocity law failures are generated by interference of the number of beams n, the interlaced scanning period i and the halftone period m for each occurrence of E scanning line periods, E being the smallest common product of n, i and m. Furthermore, the period of this moire is subject to interference from the period q of the deflection device, and moire is generated by interference with a period of E by q.

If the smallest common product of n, i, m and q in this case is G, then moire is generated with a period of G lines. In the present embodiment, the number of beams n=16, the interlaced scanning period i=3, the halftone period m=5 and the number of facets of the polygon mirror 52 q=6. Therefore, as shown in FIG. 19, banding due to reciprocity law failures is reinforced for each occurrence of the smallest common product G=240 lines.

Accordingly, if the scanning line spacing in the sub-scanning direction p=0.0212 mm, G·p=240×0.0212=5.088 mm, and the spatial frequency of the repetitions is 0.1965 cycle/mm.

Therefore, in an image-forming apparatus in which the above conditions are specified, the spatial frequency of banding due to reciprocity law failures can be set to the range of not more than 0.4 cycle/mm, in which the banding is hard for the human eye to discern as image defects, and high quality images can be provided.

As described above, the image-forming apparatus relating to the fifth embodiment is specified such that, with the number of beams n, the scanning line spacing p, the interlaced scanning period i, the number of facets of the polygon mirror 52 which is a deflection device q and a natural number m, a period of recursion in the sub-scanning direction of the image is m times the scanning line spacing p, and the smallest common product G of m, n, q and i satisfies the following equation:

$$1/(G \cdot p) \leq 0.4 \text{ cycle/mm}$$

Thus, image defects of banding due to reciprocity law failures can be made hard to discern at the human eye, and high quality images can be formed.

What is claimed is:

1. An optical scanning device comprising:
   a laser array which emits laser beams including a number of beams n; and
   a laser scanning section which, when an interlaced scanning period i, which is at least 2, is set to a natural number i which is a quotient when a beam spacing r on a scanned surface, between beams which are adjacent in a sub-scanning direction, is divided by a scanning line spacing p at the scanned surface, scans the laser beams emitted from the laser array with the interlaced scanning period i such that:

$$1/(n \cdot p) \leq 3 \text{ cycle/mm}.$$

2. The optical scanning device of claim 1, wherein the laser scanning section scans the laser beams such that the beam number n and the interlaced scanning period i are relatively prime natural numbers, and n>i.

3. The optical scanning device of claim 1, wherein the laser scanning section scans the laser beams such that the beam number n and the interlaced scanning period i are relatively prime natural numbers and a remainder when {i·(n−1)+1} is divided by the beam number n is a natural number less than n.

4. The optical scanning device of claim 1, wherein the laser array emits the laser beams such that a beam diameter d, for intensities of the laser beams on the scanned surface of $1/e^2$ of peak intensity, and the beam spacing r satisfy:

$$d/1.70 \leq r \leq d.$$

5. The optical scanning device of claim 2, wherein the laser array emits the laser beams such that a beam diameter d, for intensities of the laser beams on the scanned surface of $1/e^2$ of peak intensity, and the beam spacing r satisfy:

$$d/1.70 \leq r \leq = d.$$

6. The optical scanning device of claim 3, wherein the laser array emits the laser beams such that a beam diameter d, for intensities of the laser beams on the scanned surface of $1/e^2$ of peak intensity, and the beam spacing r satisfy:

$$d/1.70 \leq r \leq d.$$

7. The optical scanning device of claim 1, wherein the:
   laser scanning section scans the laser beams emitted from the laser array with the interlaced scanning period i such that:

$$1/(n \cdot p \cdot i) \leq 0.4 \text{ cycle/mm}.$$

8. The optical scanning device of claim 1, wherein when:
   the laser scanning section has
   a period of repetition in the sub-scanning direction of the image which is m, which is a natural number, multiplied by the scanning line spacing p, and
   a smallest common product of i, m and n which is E, the laser scanning section scans the laser beams emitted from the laser array with the interlaced scanning period i such that:

$$1/(E \cdot p) \leq 0.4 \text{ cycle/mm}.$$

9. The optical scanning device of claim 1, wherein when
   a number of facets of a rotating polygon mirror which deflects the laser beams in a main scanning direction is q, and a smallest common product of i, n and q is F, the laser scanning section scans the laser beams emitted from the laser array with the interlaced scanning period i such that:

$1/(F \cdot p) \leq 0.4$ cycle/mm.

10. The optical scanning device of claim 1, wherein
the laser scanning section includes a rotating polygon mirror which deflects the laser beams in a main scanning direction which, wherein when
a number of facets of the rotating polygon mirror which deflects the laser beams in a main scanning direction is q,
a period of repetition in the sub-scanning direction of the image is m, which is a natural number, multiplied by the scanning line spacing p, and
a smallest common product of i, m, n and q is G, the laser scanning section scans the laser beams emitted from the laser array with the interlaced scanning period i such that:

$1/(G \cdot p) \leq 0.4$ cycle/mm.

* * * * *